(12) United States Patent
Taufik et al.

(10) Patent No.: US 11,699,953 B2
(45) Date of Patent: Jul. 11, 2023

(54) ZERO VOLTAGE SWITCHING HYBRID VOLTAGE DIVIDER

(71) Applicant: CAL POLY CORPORATION, San Luis Obispo, CA (US)

(72) Inventors: Taufik, Santa Maria, CA (US); Owen Jong, San Jose, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 117 days.

(21) Appl. No.: 17/339,704

(22) Filed: Jun. 4, 2021

(65) Prior Publication Data

US 2021/0408904 A1 Dec. 30, 2021

Related U.S. Application Data

(60) Provisional application No. 63/043,690, filed on Jun. 24, 2020.

(51) Int. Cl.
*H02M 3/07* (2006.01)
*H02M 3/158* (2006.01)
*H02M 1/00* (2006.01)

(52) U.S. Cl.
CPC ......... *H02M 3/158* (2013.01); *H02M 1/0058* (2021.05); *H02M 1/0095* (2021.05); *H02M 3/07* (2013.01)

(58) Field of Classification Search
CPC . H02M 3/07–078; H02M 3/01; H02M 1/0058
See application file for complete search history.

(56) References Cited

U.S. PATENT DOCUMENTS 10,084,384 B1 9/2018 Kotikalapoodi

FOREIGN PATENT DOCUMENTS

WO WO-2020233803 A1 * 11/2020 ............... H02M 3/07

OTHER PUBLICATIONS

Li et al; "A Family of Resonant Two-Switch Boosting Switched-Capacitor Converter with ZVS Operation and a Wide Line Regulation Range"; IEE Transactions on Power Electronics, vol. 33, No. 1; Jan. 2018; 12 pages.

(Continued)

*Primary Examiner* — Peter M Novak
(74) *Attorney, Agent, or Firm* — Fitch, Even, Tabin & Flannery LLP

(57) ABSTRACT

Methods, systems, and apparatuses for efficient power supply and voltage division are described. Specifically, the described zero-voltage switching hybrid voltage divider (ZVS-HVD) may implement capacitor-inductor switching (e.g., a capacitor-inductor switching combination) to provide a zero-voltage switching bidirectional voltage divider converter. The ZVD-HVD may be implemented, in the example of a two-to-one ratio divider, via a configuration of three switches, three capacitors, and two small size inductors (e.g., to achieve zero voltage switching in any condition). In some examples, the ZVS-HVD may be realized via two of the switches sharing a same switching signal (e.g., the two-to-one ratio divider example of the described ZVS-HVD may be associated with two circuit states via the three switches). The described ZVS-HVD may support continuous input current, parallelizability, insensitivity to parasitic inductance, and high efficiency (e.g., reduced energy loss) at light load, among other features.

15 Claims, 18 Drawing Sheets

(56) References Cited

OTHER PUBLICATIONS

Uno et al; "PWM Switched Capacitor Converter with Switched-Capacitor-Inductor Cell for Adjustable High Step-Down Volatge Conversion"; IEE Transactions on Power Electronics, vol. 34, No. 1, Jan. 2019; 13 pages.

* cited by examiner

ZERO VOLTAGE SWITCHING HYBRID VOLTAGE DIVIDER

This application claims the benefit of U.S. Provisional Application No. 63/043,690, filed Jun. 24, 2020, for ZERO VOLTAGE SWITCHING HYBRID VOLTAGE DIVIDER, which is incorporated in its entirety herein by reference.

BACKGROUND OF THE INVENTION

1. Field of the Invention

The present invention relates generally to power supply, and more specifically to a zero-voltage switching hybrid voltage divider (ZVS-HVD).

2. Discussion of the Related Art

Various power supply systems and processes are known in the art. Developments in power supply may be critical in keeping up with increasing demand for advances in consumer electronics (e.g., analog or digital electrical equipment intended for everyday use). Consumer electronics may generally include devices used for entertainment (flatscreen TVs, DVD players, video games, remote control cars), devices used for communications (telephones, mobile phones, e-mail-capable laptops), and devices used for home activities (e.g., desktop computers, printers, smart home devices), among other examples.

Electronic devices may utilize (e.g., be connected to) a power supply from various power sources such as one or more batteries, wall power or other power outlets, etc. In some cases, for efficient operation, such powered electronic devices may convert one type of power to another, may increase or decrease supplied voltage and current, etc. As modern electronics continue to evolve, innovative techniques for managing power demands may be desired.

SUMMARY

An apparatus, system, and method for a zero-voltage switching hybrid voltage divider (ZVS-HVD) are described. Embodiments of the apparatus, system, and method may include a first node and a second node configured to receive a direct current supply voltage, a first inductor coupled between the first node, and a third node, a first capacitor coupled between the first node, and a fourth node, a first switch coupled between the fourth node, and the third node, a second capacitor coupled between the third node, and a fifth node, a second inductor coupled between the fifth node, and a sixth node, a second switch coupled between the third node, and the sixth node, and a third capacitor coupled between a second node, and the sixth node, wherein the second node, and the sixth node are configured to supply a load.

A method, apparatus, and system for a ZVS-HVD are described. Embodiments of the method, apparatus, and system may provide a first node and a second node configured to receive a direct current supply voltage, provide a first inductor coupled between the first node, and a third node, provide a first capacitor coupled between the first node, and a fourth node, provide a first switch coupled between the fourth node, and the third node, provide a second capacitor coupled between the third node, and a fifth node, provide a second inductor coupled between the fifth node, and a sixth node, provide a second switch coupled between the third node, and the sixth node, provide a third capacitor coupled between a second node, and the sixth node, wherein the second node, and the sixth node are configured to supply a load, apply a first switching signal to the first switch, apply a second switching signal simultaneously to the second switch and the third switch, first signaling with the first switching signal and the second switching signal to close the first switch and open the second switch and the third switch, second signaling with the first switching signal and the second switching signal to open the first switch and close the second switch and the third switch, and repeat the first switching and the second switching sequentially.

DETAILED DESCRIPTION

Figure 1:
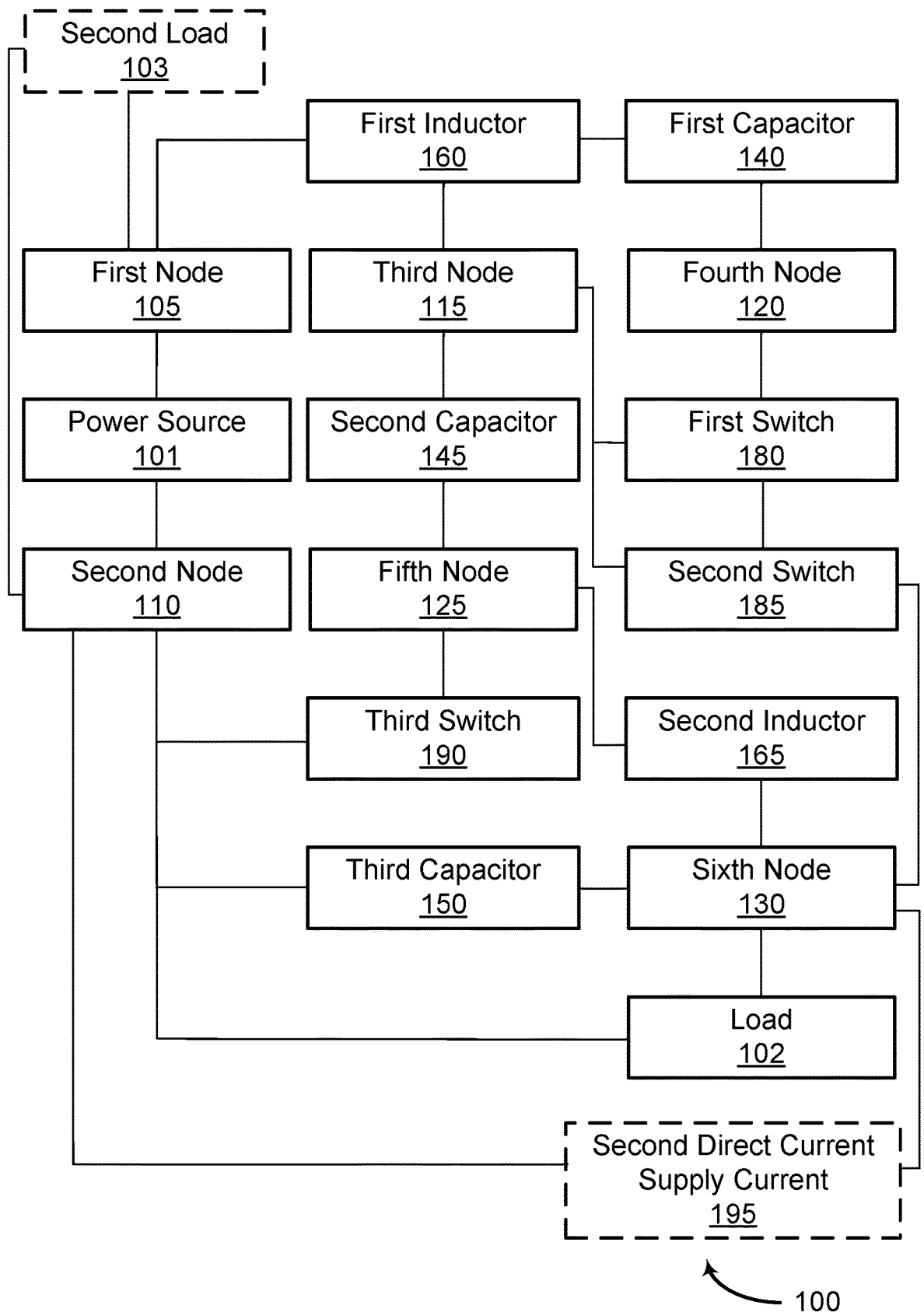
FIG. 1 shows an example of a circuit for voltage division according to aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Electronic devices (e.g., consumer electronic devices) may utilize power supply from various power sources such as one or more batteries, wall power or other power outlets, etc. In some cases, for efficient operation, such powered electronic devices may convert one type of power to another, may increase or decrease supplied voltage and current, etc. As modern electronics continue to evolve, innovative techniques for managing power demands may be desired.

For instance, in some examples, an electronic device (e.g., a mobile phone) may include one or more rechargeable batteries. In such cases, the electronic device may draw power from the one or more rechargeable batteries and the battery capacity may be recharged, for example, via a power outlet or other external power source. Due to the increase in energy demand on mobile phones (e.g., as mobile phone capabilities expand and mobile phone usage increases), faster electronic device charging times may be desired in addition to increased battery capacity demands.

The techniques described herein may provide for an efficient voltage divider. Specifically, the described zero-voltage switching hybrid voltage divider (ZVS-HVD) may implement capacitor-inductor switching (e.g., a capacitor-inductor switching combination) to provide a zero-voltage switching bidirectional voltage divider converter.

Further, the described ZVS-HVD may provide for increased energy savings and reduced noise (e.g., less input filter, lower cost) compared to conventional voltage dividers. Other performance improvements may include support of continuous input current, parallelizability, insensitivity to parasitic inductance, high efficiency (e.g., reduced energy loss) at light load, etc.

Various electronic devices may implement the techniques described herein (e.g., an electronic device or system may include a ZVS-HVD) for more efficient voltage division, power conversion, etc. As an example, the described ZVS-HVD may provide for more efficient voltage conversion which may facilitate increased charging power (e.g., Universal Serial Bus (USB) port voltage may be increased, which may increase charging power to one or more batteries of an electronic device being charged). As such, battery chargers for electronic devices, such as consumer electronics and other gadgets, may be improved in terms of speed and efficiency. Other uses may include bidirectional power supply for electric vehicles and other direct current (DC) bus systems, renewable energy charge controllers, and rail to rail power supply for analog and digital electronics, among other examples.

FIG. 1 shows an example of a circuit 100 for voltage division according to aspects of the present disclosure. The example shown includes node elements, capacitor elements, inductor elements, and switch elements. The example of FIG. 1 may illustrate one or more aspects of capacitor-inductor switching (e.g., a capacitor-inductor switching combination) to provide a zero-voltage switching bidirectional voltage divider converter.

Circuit 100 may illustrate one or more aspects of a ZVS-HVD as described in more detail herein. For example, one or more aspects of FIGS. 1-18 may illustrate and describe example configurations, currents, voltages, etc., of circuit 100. The node elements may include first node 105 (N1), second node 110 (N2), third node 115 (N3), fourth node 120 (N4), fifth node 125 (N5), and sixth node 130 (N6). Capacitor elements may include first capacitor 140 (C1), second capacitor 145 (C2), and third capacitor 150 (C3). Inductor elements may include first inductor 160 (L1) and second inductor 165 (L2). Switch elements may include first switch 180 (Q1), second switch 185 (Q2), and third switch 190 (Q3).

In addition to node elements, capacitor elements, inductor elements, and switch elements, a circuit 100 for voltage division (e.g., ZVS-HVDs) may also include a power source 101 (e.g., $V_{in}$) and a load 102.

A power source 101 may include any component or source of power supply. For instance, a power source 101 may include a battery, an electric generator, a power outlet (e.g., wall power), etc. A load 102 may include any component of a circuit that consumes power or energy (e.g., such as a light emitting diode (LED), etc.). In an example where a ZVS-HVD is integrated to improve charging to a battery, such as a battery of a mobile device or other consumer electronic device, a power source 101 may include an external charger or wall power outlet (e.g., connected to the device via a USB port) and the load 102 may include the battery itself (e.g., as when charging a battery of a device, the battery may be the load 102 and the external power supply may be the power source 101).

A battery is a device, or a component of a device, that stores and discharges energy through the controlled conversion of chemical energy to electric energy. Energy is stored by preventing the flow of electrons between chemical reactants with different electric potential. Energy is released when electrons are allowed to flow between a positive terminal (cathode) and a negative terminal (anode). When the terminals are connected, the compounds undergo chemical reactions that are known as oxidation and reduction. The chemical reactions may cause a flow of electrolytes and drive current through a circuit. Batteries may be classified by the type of electrochemical cells that contain the chemical reactants. Cell types include galvanic cells, electrolytic cells, fuel cells, flow cells, saltwater cells, molten salt cells, and voltaic piles. These cells may use a liquid electrolyte (wet cell) or a low-moisture paste (dry cell). A battery may be either single-use (primary) and rechargeable (secondary). The chemical reactions of a primary battery may be irreversible, and the battery may stop producing current once it has exhausted the supply of chemical reactants. The chemical reactions of a secondary battery may be reversed by applying a voltage in the opposite direction thereby replenishing the supply of chemical reactants.

A capacitor is an electrical component that stores energy in an electric field. In some examples, capacitors may contain two or more electrical conductors separated to prevent the conductors from contacting. These conductors may be in the form of metal plates or sheets. As charge moves through a circuit containing a capacitor and a voltage source, electrons accumulate on one of the sheets. Capacitors may be used to store energy, to create a pulse of energy, to smooth current, to couple or decouple signals, and for other purposes. Dielectric material may be used to separate the conductors in a capacitor. Dielectric materials include glass, ceramic, polymers, paper, mica, or oxides. The type of material used may affect properties of the capacitor, including its capacity for charge (capacitance), the amount of voltage that may be applied before failing, and the operating temperature of the capacitor. A capacitor may fail once it can no longer hold a charge, which may happen when its dielectric becomes conductive (e.g., at a certain temperature), or after degradation of the material. Specifically, in some cases capacitors may generate high temperatures under continuous operation. This may make them unsuitable for some continuous high voltage operations.

An inductor (e.g., a reactor, coil, choke, etc.) is an electrical component that stores energy in a magnetic field when electric current flows through it. An inductor may include insulated wire wound into a coil around a core.

When current flowing through an inductor changes, the time-varying magnetic field induces a voltage (e.g., an electromotive force) in the conductor. In an inductor, the induced voltage has a direction (e.g., a polarity) which opposes the change in the current inducing the voltage. As such, inductors generally oppose any changes in current through (e.g., any changes in current flowing through the inductor). In some cases, an inductor may be characterized by its inductance (e.g., the ratio of the voltage to the rate of change of current flowing through the inductor).

Figure 3:
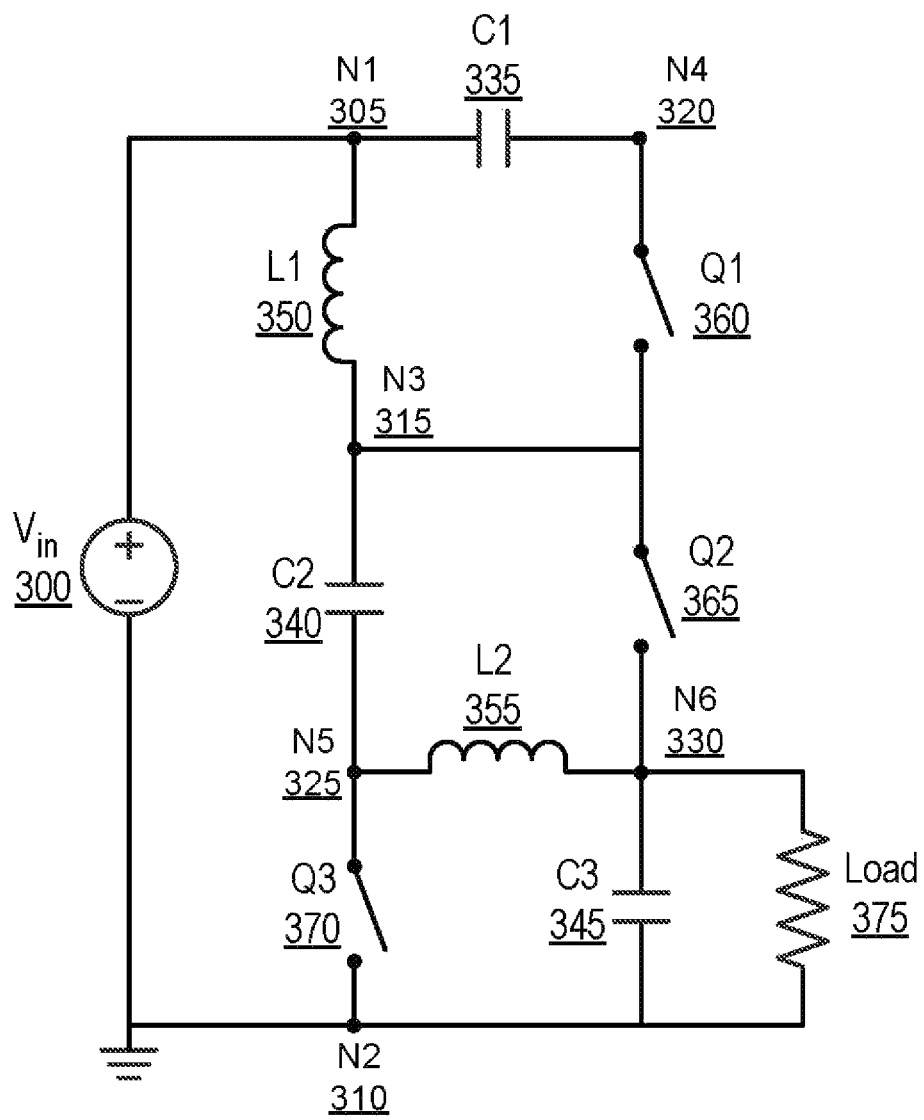
FIGS. 3 through 5 show examples of ZVS-HVD according to aspects of the present disclosure.

In the example of a two-to-one ratio ZVS-HVD (e.g., as described in more detail herein, for example, with reference to FIG. 3), the ZVS-HVD may include two small size inductors (first inductor 160 and second inductor 165). The two inductors may be configured to achieve zero voltage switching in any condition (e.g., in any applied switching signal conditions, in switching between the two circuit states described with reference to FIGS. 4 and 5, etc.). In some examples, a ZVS-HVD may be realized via two of the switches (second switch 185 and third switch 190) sharing a same switching signal. In such examples, the two-to-one ratio divider example of the described ZVS-HVDs may be associated with two circuit states via the three switches (e.g., as further described herein, for example, with reference to FIGS. 4 and 5). The described ZVS-HVDs may support continuous input current, parallelizability, insensitivity to parasitic inductance, and high efficiency (e.g., reduced energy loss) at light load, among other features.

In some cases, the terms "first," "second," "third," "fourth," etc., when used in the context of labeling electrical components of various described ZVS-HVDs (e.g., such as nodes, capacitors, inductors, switches), may be used for descriptive purposes, and may not necessarily imply the number or ordering of respective components for a given ZVS-HVD or ZVS-HVD diagram. That is, some of FIGS. 1-18 may illustrate variations of ZVS-HVDs where aspects of other configurations may be referenced by usage of terms such "first," "second," "third," "fourth," etc. For example, FIGS. 4 and 5 may each illustrate a different circuit state of the two-to-one ratio ZVS-HVD described with reference to FIG. 3. As such, FIG. 5 may refer to a "second switch (Q2)" and a "third switch (Q3)" to illustrate and describe the energy flow during a certain circuit state of the two-to-one ratio ZVS-HVD described with reference to FIG. 3, although there may be only two active (e.g., and thus illustrated and described) switches in the context of FIG. 5.

As discussed herein, development and evolution of modern electronics may be associated with an increase in energy demand on electronic devices (e.g., on mobile phones). As an example, modern mobile phones may be associated with increased battery capacity relative to earlier versions of mobile phones. In some cases, battery capacity (e.g., energy capacity of a battery) may be measured in units of milliamp Hours (mAh), which may measure power (e.g., electric power) of a battery over time. For instance, batteries with more mAh may be associated with more battery capacity, longer battery life, etc.

As an example, mobile phones released in 2009 may have been associated with a battery capacity of 1220 mAh, whereas mobile phones released in 2019 may be associated with battery capacities of, for example, 3,110 mAh, 3,046 mAh, 3,969 mAh, etc. (e.g., in addition to 4 or more gigabytes (GB) of random access memory (RAM)). As battery capacity increases, there may also be an increase in demand for faster charging times.

In some cases, an electronic device (e.g., a mobile phone) may include a DC/DC converter, a power management integrated circuit (IC), and a battery. In some cases, the battery may be configured to multi-stack (e.g., double stack may provide 7.4V battery voltage). The electronic device (e.g., the battery) may be charged through a USB port (e.g., a 5V USB port, a 9V USB port, or a 12V USB port) via a 3 A cable. However, USB port voltage (V) may not be limited only to 5V, 9V, and 12V (e.g., depending on the manufacturer). Increasing the USB port voltage may allow increasing charging power to the battery.

However, efficient voltage conversion may be desired when increasing charging power. The described voltage conversion techniques and the described ZVS-HVDs may implement capacitor-inductor switching (e.g., a capacitor-inductor switching combination) to provide a zero-voltage switching bidirectional voltage divider converter. Such may provide for increased energy savings and reduced noise (e.g., less input filter, lower cost) compared to conventional voltage dividers.

For instance, conventional solutions may include a 2 to 1 switched-capacitor voltage divider (e.g., which may be known for no regulation, zero-current switching (ZCS) 50% fixed duty cycle operation, high efficiency operation (97% peak, 80%-90% light load), etc.). However, a 2 to 1 switched-capacitor voltage divider may be associated with discontinuous input or source current (e.g., input current may be discontinuous with high ripple), increased cost (e.g., larger size input capacitor requirements may be associated with higher costs), reduced life time of input capacitor, and higher noise levels. Table 1 summarizes example characteristics of conventionally used 2 to 1 switched-capacitor voltage dividers.

TABLE 1

| Pros | Cons |
|---|---|
| ZCS operation | ZCS difficult to achieve due to parasitic inductance |
| No magnetic component | Eliminates ZVS capability |
| Fast transient | Can't use low drain-source on-state resistance (Rds) devices since output capacitance (Coss) will be large → worsen efficiency due to ½CV²f |
| | Poor light load efficiency with fixed frequency operation |
| | Optimization of switch is difficult due to balancing Coss and Rds → limited option of switching devices |
| | Frequency dependent loss is determined by devices |
| | Switching losses difficult to eliminate |
| | Discontinuous source or input current → EMI noise, large capacitance C1 requirement |
| | Large capacitance C1 current requirement → heat, reduced lifetime of C1 |

The techniques described herein (e.g., ZVS-HVDs) may provide for more efficient voltage conversion, power supply, etc. In a 2 to 1 ZVS-HVD example, three switches (e.g., first switch 180, second switch 185, and third switch 190) may be used (e.g., which generally may be any type of semiconductor switches). A 2 to 1 ZVS-HVD may add two small size inductors (e.g., first inductor 160 and second inductor 165) to achieve zero-voltage switching in any condition. In some examples, the first inductor 160 and second inductor 165 may be coupled (e.g., one component). The inductors may reduce input capacitor requirements (e.g., which may reduce costs of the input capacitor, increase life-time of input capacitor, etc.). A first capacitor 140 may be a small decoupling capacitor. In some cases, duty cycle may be fixed to 50%. A conventional 2 to switched-capacitor voltage divider is compared to a described 2 to 1 ZVS-HVD in Table 2.

TABLE 2

|  | Conventional Solution | ZVS-HVD |
| --- | --- | --- |
| Number of Switches | 4 | 3 |
| Switch Voltage Stress | $0.5*V_{in}$ | $V_{in}$ |
| Zero Voltage Switching | No | Yes |
| C2 RMS Current | $I_{out}$ | $0.5*I_{out}$ |
| Number of Inductors | 0 | 2 (could be coupled) |
| Sensitive to Parasitic Inductance | Yes | No |
| Bidirectional | Yes | Yes |
| Parallelable | No | Yes |
| Input Current | Discontinuous with large ripple | Continuous with small ripple |
| Switch optimization to reduce loss | Difficult | Easy |

For instance, for a 2 to 1 ZVS-HVD, node elements may include (provide) a first node 105 and a second node 110 configured to receive a direct current supply voltage (e.g., from a power source 101, such as a power outlet or external power supply). In some cases, a second direct current supply current 195 may be coupled between the second node 110 and the sixth node 130. In some cases, a second load 103 may be coupled between the first node 105 and the second node 110, whereby the hybrid voltage divider (the ZVS-HVD) may be configured as a zero-voltage switching bidirectional voltage divider. The second direct current supply current 195 and the second load 103 are indicated in FIG. 1 by dashed lines. In some examples, a second ZVS-HVD may be coupled to the load in parallel with the ZVS-HVD (e.g., for parallelization of a ZVS-HVD, for a N-to-one ZVS-HVD, etc.).

Node elements may include first node 105, second node 110, third node 115, fourth node 120, fifth node 125, and sixth node 130. First node 105 (N1) may be an example of, or include aspects of, the corresponding element or elements described with reference to FIGS. 1-4. Second node 110 (N2) may be an example of, or include aspects of, the corresponding element or elements described with reference to FIGS. 1-3 and 5. Third node 115 (N3) may be an example of, or include aspects of, the corresponding element or elements described with reference to FIGS. 1-5. Fourth node 120 (N4) may be an example of, or include aspects of, the corresponding element or elements described with reference to FIGS. 1-4. Fifth node 125 (N5) may be an example of, or include aspects of, the corresponding element or elements described with reference to FIGS. 1-3 and 5. Sixth node 130 (N6) may be an example of, or include aspects of, the corresponding element or elements described with reference to FIGS. 1-5.

Capacitor elements may include (provide) a first capacitor 140 coupled between the first node 105 and the fourth node 120. Capacitor elements may also provide a second capacitor 145 coupled between the third node 115 and the fifth node 125. Capacitor elements may also provide a third capacitor 150 coupled between the second node 110 and the sixth node 130, where the second node 110 and the sixth node 130 are configured to supply a load.

Capacitor elements may include first capacitor 140, second capacitor 145, and third capacitor 150. First capacitor 140 (C1) may be an example of, or include aspects of, the corresponding element or elements described with reference to FIGS. 1-5, and 18. Second capacitor 145 (C2) may be an example of, or include aspects of, the corresponding element or elements described with reference to FIGS. 1-5, and 18. Third capacitor 150 (C3) may be an example of, or include aspects of, the corresponding element or elements described with reference to FIGS. 1-5, and 18.

Inductor elements may include (provide) a first inductor 160 coupled between the first node 105 and a third node 115. Inductor elements may also provide a second inductor 165 coupled between the fifth node 125 and a sixth node 130. In some examples, the first inductor 160 and the second inductor 165 are coupled inductors.

Inductor elements may include first inductor 160 and second inductor 165. First inductor 160 (L1) may be an example of, or include aspects of, the corresponding element or elements described with reference to FIGS. 1-5, and 18. Second inductor 165 (L2) may be an example of, or include aspects of, the corresponding element or elements described with reference to FIGS. 1-5, and 18.

Switch elements may include first switch 180 (Q1), second switch 185 (Q2), and third switch 190 (Q3). First switch 180 may be coupled between the fourth node 120 and the third node 115. First switch 180 may be an example of, or include aspects of, the corresponding element or elements described with reference to FIGS. 1, 3, 4, and 18. Second switch 185 may be coupled between the third node 115 and the sixth node 130. Second switch 185 may be an example of, or include aspects of, the corresponding element or elements described with reference to FIGS. 1, 3, 5, and 18. Third switch 190 may be coupled between the fifth node 125 and the second node 110. Third switch 190 may be an example of, or include aspects of, the corresponding element or elements described with reference to FIGS. 1, 3, 5, and 18.

In some examples, a first switching signal is coupled to the first switch 180 (Q1). In some examples, a second switching signal is coupled to the second switch 185 and a third switch 190 (e.g., second switch 185 (Q2) and third switch 190 (Q3) may share the same switching signal). In some examples, the first switching signal and the second switching signal are configured to close the first switch 180, open the second switch 185, and open the third switch 190 in a first circuit state (e.g., as further described herein, for example, with reference to FIG. 4). In some examples, the first switching signal and the second switching signal are configured to open the first switch 180, close the second switch 185, and close the third switch 190 in a second circuit state (e.g., as further described herein, for example, with reference to FIG. 5). In some examples, the first switching signal has a duty cycle of 50%. In some examples, the second switching signal has a duty cycle of 50%.

Switch elements may include (provide) a first switch 180 coupled between the fourth node 120 and the third node 115. Switch elements may also provide a second switch 185 coupled between the third node 115 and the sixth node 130. Switch elements may also receive and apply a first switching signal to the first switch 180. Switch elements may also receive and apply a second switching signal simultaneously to the second switch 185 and the third switch 190 (e.g., as second switch 185 and third switch 190 may share the same switching signal).

In some examples, first signaling may include the first switching signal and the second switching signal configured to close the first switch 180, open the second switch 185, and open the third switch 190 (e.g., the first switching signal may close the first switch 180, and the second switching signal may open the second switch 185 and the third switch 190).

In some examples, second signaling may include the first switching signal and the second switching signal configured to open the first switch 180, close the second switch 185, and close the third switch 190 (e.g., the first switching signal may open the first switch 180, and the second switching signal may close the second switch 185 and the third switch 190). In some cases, the first switching and the second switching may be repeated sequentially. In some examples, the first switching signal has a duty cycle of 50%. In some examples, the second switching signal has a duty cycle of 50%.

Figure 2:
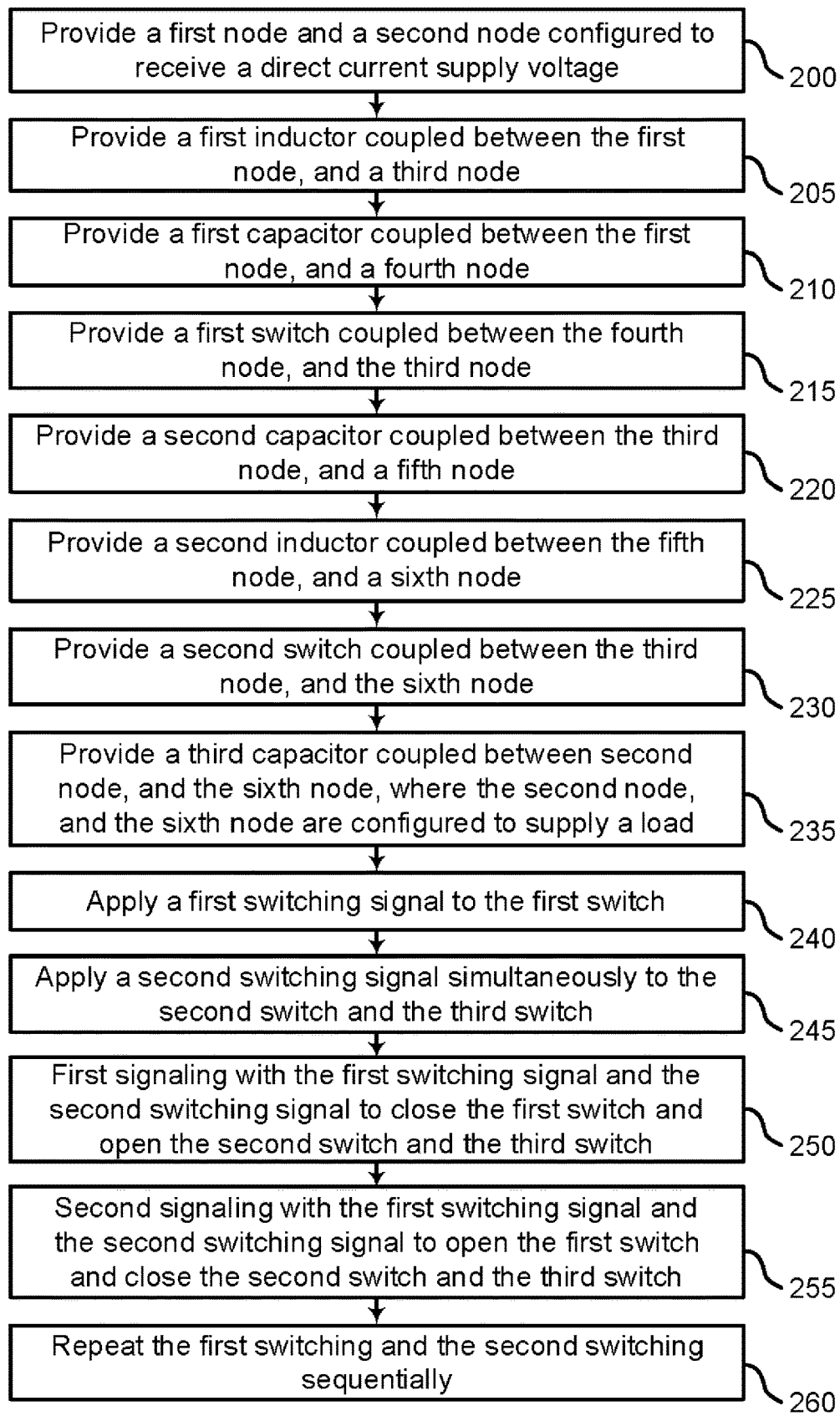
FIG. 2 shows an example of a process for a zero-voltage switching hybrid voltage divider (ZVS-HVD) according to aspects of the present disclosure.

FIG. 2 shows an example of a process for a ZVS-HVD according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 200, the system provides a first node and a second node configured to receive a direct current supply voltage. In some cases, the operations of this step may refer to, or be performed by, a power source and node elements as described with reference to FIG. 1.

At operation 205, the system provides a first inductor coupled between the first node, and a third node. In some cases, the operations of this step may refer to, or be performed by, inductor elements as described with reference to FIG. 1.

At operation 210, the system provides a first capacitor coupled between the first node, and a fourth node. In some cases, the operations of this step may refer to, or be performed by, capacitor elements as described with reference to FIG. 1.

At operation 215, the system provides a first switch coupled between the fourth node, and the third node. In some cases, the operations of this step may refer to, or be performed by, switch elements as described with reference to FIG. 1.

At operation 220, the system provides a second capacitor coupled between the third node, and a fifth node. In some cases, the operations of this step may refer to, or be performed by, capacitor elements as described with reference to FIG. 1.

At operation 225, the system provides a second inductor coupled between the fifth node, and a sixth node. In some cases, the operations of this step may refer to, or be performed by, inductor elements as described with reference to FIG. 1.

At operation 230, the system provides a second switch coupled between the third node, and the sixth node. In some cases, the operations of this step may refer to, or be performed by, switch elements as described with reference to FIG. 1.

At operation 235, the system provides a third capacitor coupled between a second node, and the sixth node, where the second node, and the sixth node are configured to supply a load. In some cases, the operations of this step may refer to, or be performed by, capacitor elements as described with reference to FIG. 1.

At operation 240, the system applies a first switching signal to the first switch. In some cases, the operations of this step may refer to, or be performed by, switch elements as described with reference to FIG. 1.

At operation 245, the system applies a second switching signal simultaneously to the second switch and the third switch. In some cases, the operations of this step may refer to, or be performed by, switch elements as described with reference to FIG. 1.

At operation 250, the system first signaling with the first switching signal and the second switching signal to close the first switch and open the second switch and the third switch. In some cases, the operations of this step may refer to, or be performed by, switch elements as described with reference to FIG. 1.

At operation 255, the system second signaling with the first switching signal and the second switching signal to open the first switch and close the second switch and the third switch. In some cases, the operations of this step may refer to, or be performed by, switch elements as described with reference to FIG. 1.

At operation 260, the system repeats the first switching and the second switching sequentially. In some cases, the operations of this step may refer to, or be performed by, switch elements as described with reference to FIG. 1.

FIG. 3 shows an example of a ZVS-HVD according to aspects of the present disclosure. The example shown includes power source 300 ($V_{in}$), first node 305 (N1), second node 310 (N2), third node 315 (N3), fourth node 320 (N4), fifth node 325 (N5), sixth node 330 (N6), first capacitor 335 (C1), second capacitor 340 (C2), third capacitor 345 (C3), first inductor 350 (L1), second inductor 355 (L2), first switch 360 (Q1), second switch 365 (Q2), third switch 370 (Q3), and load 375.

A ZVS-HVD may operate as a boost converter, a switched capacitor converter, and a buck converter (e.g., based on the applied switching signals, such as a first switching signal for Q1 and a second switching signal for Q2 and Q3). In some examples, a boost converter may refer to a category of the ZVS-HVD where the voltage gain (e.g., the ratio of the output voltage $V_o$ to the input voltage $V_{in}$) is greater than one. A buck converter may refer to a category of the ZVS-HVD where the voltage gain is between 0 and 1. As such, a ZVS-HVD may provide for a highly efficient DC-to-DC converter via step-up (boost) conversion and step-down (buck) conversion. A boost converter may step up voltage (e.g., while stepping down current) from its input (power supply) to its output (load). A buck converter may step down voltage (e.g., while stepping up current) from its input (power supply) to its output (load).

As discussed herein, second switch 365 (Q2) and third switch 370 (Q3) may share a same switching signal. For example, a first switching signal may be used to open (off) and close (on) first switch 360 (Q1), and a second switching signal may be used to open and close both second switch 365 (Q2) and third switch 370 (Q3). As such, a first circuit state of the ZVS-HVD, as described in more detail with reference to FIG. 4, may include first switch 360 (Q1) being on and both second switch 365 (Q2) and third switch 370 (Q3) being off. A second circuit state of the ZVS-HVD, as described in more detail with reference to FIG. 5, may include first switch 360 (Q1) being off and both second switch 365 (Q2) and third switch 370 (Q3) being on.

Power source 300 ($V_{in}$) may be an example of, or include aspects of, the corresponding element or elements described with reference to FIGS. 1, 4, 5, 14-16, and 18. Load 375 may be an example of, or include aspects of, the corresponding element or elements described with reference to FIGS. 1, 4, 5, and 14-18.

First node 305 (N1) may be an example of, or include aspects of, the corresponding element or elements described with reference to FIGS. 1 and 4. Second node 310 (N2) may be an example of, or include aspects of, the corresponding element or elements described with reference to FIGS. 1 and 5. Third node 315 (N3) may be an example of, or include aspects of, the corresponding element or elements described with reference to FIGS. 1, 4, and 5. Fourth node 320 (N4) may be an example of, or include aspects of, the corresponding element or elements described with reference to FIGS. 1 and 4. Fifth node 325 (N5) may be an example of, or include aspects of, the corresponding element or elements described with reference to FIGS. 1 and 5. Sixth node 330 (N6) may be an example of, or include aspects of, the corresponding element or elements described with reference to FIGS. 1, 4, and 5.

First capacitor 335 (C1) may be an example of, or include aspects of, the corresponding element or elements described with reference to FIGS. 1, 4, 5, and 18. Second capacitor 340 (C2) may be an example of, or include aspects of, the corresponding element or elements described with reference to FIGS. 1, 4, 5, and 18. Third capacitor 345 (C3) may be an example of, or include aspects of, the corresponding element or elements described with reference to FIGS. 1, 4, 5, and 18.

First inductor 350 (L1) may be an example of, or include aspects of, the corresponding element or elements described with reference to FIGS. 1, 4, 5, and 18. Second inductor 355 (L2) may be an example of, or include aspects of, the corresponding element or elements described with reference to FIGS. 1, 4, 5, and 18.

First switch 360 (Q1) may be an example of, or include aspects of, the corresponding element or elements described with reference to FIGS. 1, 4, and 18. Second switch 365 (Q2) may be an example of, or include aspects of, the corresponding element or elements described with reference to FIGS. 1, 5, and 18. Third switch 370 (Q3) may be an example of, or include aspects of, the corresponding element or elements described with reference to FIGS. 1, 5, and 18.

Figure 4:
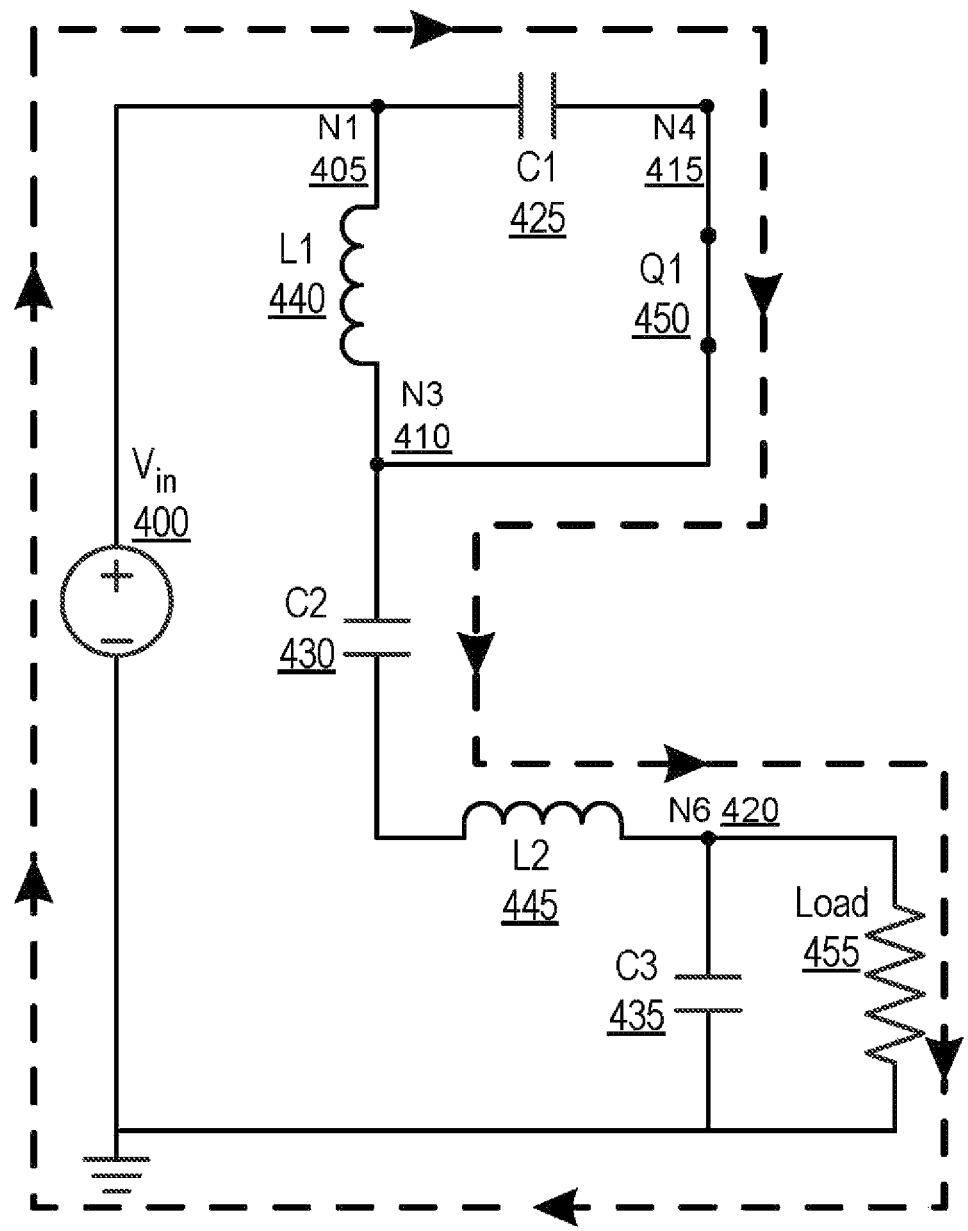

FIG. 4 shows an example of a ZVS-HVD according to aspects of the present disclosure. The example shown includes power source 400 ($V_{in}$), first node 405 (N1), third node 410 (N3), fourth node 415 (N4), sixth node 420 (N6), first capacitor 425 (C1), second capacitor 430 (C2), third capacitor 435 (C3), first inductor 440 (L1), second inductor 445 (L2), first switch 450 (Q1), and load 455.

As described herein, second switch (Q2) and third switch (Q3) may share a same switching signal. As such, a first circuit state of the ZVS-HVD may include first switch 450 (Q1) being on (e.g., as both second switch 365 (Q2) and third switch 370 (Q3) as described with reference to FIG. 3 may be off). FIG. 4 may illustrate the energy flow during such a circuit state.

Power source 400 ($V_{in}$) may be an example of, or include aspects of, the corresponding element or elements described with reference to FIGS. 1, 3, 5, 14-16, and 18. Load 455 may be an example of, or include aspects of, the corresponding element or elements described with reference to FIGS. 1, 3, 5, and 14-18.

First node 405 (N1) may be an example of, or include aspects of, the corresponding element or elements described with reference to FIGS. 1 and 3. Third node 410 (N3) may be an example of, or include aspects of, the corresponding element or elements described with reference to FIGS. 1, 3, and 5. Fourth node 415 (N4) may be an example of, or include aspects of, the corresponding element or elements described with reference to FIGS. 1 and 3. Sixth node 420 (N6) may be an example of, or include aspects of, the corresponding element or elements described with reference to FIGS. 1, 3, and 5.

First capacitor 425 (C1) may be an example of, or include aspects of, the corresponding element or elements described with reference to FIGS. 1, 3, 5, and 18. Second capacitor 430 (C2) may be an example of, or include aspects of, the corresponding element or elements described with reference to FIGS. 1, 3, 5, and 18. Third capacitor 435 (C3) may be an example of, or include aspects of, the corresponding element or elements described with reference to FIGS. 1, 3, 5, and 18.

First inductor 440 (L1) may be an example of, or include aspects of, the corresponding element or elements described with reference to FIGS. 1, 3, 5, and 18. Second inductor 445 (L2) may be an example of, or include aspects of, the corresponding element or elements described with reference to FIGS. 1, 3, 5, and 18.

First switch 450 (Q1) may be an example of, or include aspects of, the corresponding element or elements described with reference to FIGS. 1, 3, and 18.

Figure 5:
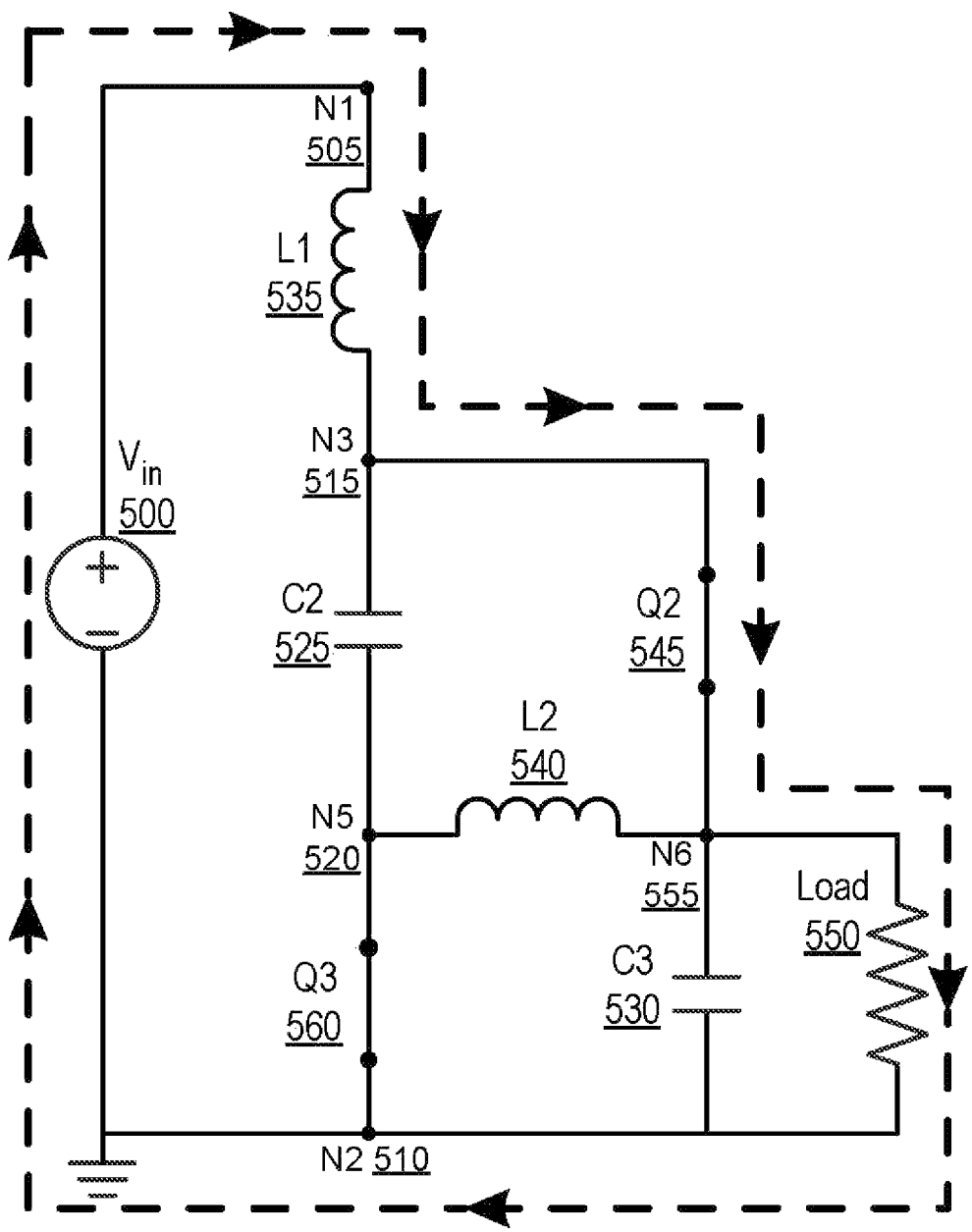

FIG. 5 shows an example of a ZVS-HVD according to aspects of the present disclosure. The example shown includes power source 500 ($V_{in}$), first node 505 (N1), second node 510 (N2), third node 515 (N3), fifth node 520 (N5), second capacitor 525 (C2), third capacitor 530 (C3), first inductor 535 (L1), second inductor 540 (L2), second switch 545 (Q2), load 550, sixth node 555 (N1), and third switch 560 (Q3).

As described herein, second switch (Q2) and third switch (Q3) may share a same switching signal. As such, a first circuit state of the ZVS-HVD may include first switch (Q1) being off (e.g., as first switch 360 (Q1) as described with reference to FIG. 3 may be off), and second switch 545 (Q2) and third switch 560 (Q3) may be on. FIG. 5 may illustrate the energy flow during such a circuit state.

Power source 500 ($V_{in}$) may be an example of, or include aspects of, the corresponding element or elements described with reference to FIGS. 1, 3, 4, 14-16, and 18. Load 550 may be an example of, or include aspects of, the corresponding element or elements described with reference to FIGS. 1, 3, 4, and 14-18.

First node 505 (N1) may be an example of, or include aspects of, the corresponding element or elements described with reference to FIGS. 1 and 3. Second node 510 (N2) may be an example of, or include aspects of, the corresponding element or elements described with reference to FIGS. 1 and 3. Third node 515 (N3) may be an example of, or include aspects of, the corresponding element or elements described with reference to FIGS. 1, 3, and 4. Fifth node 520 (N5) may be an example of, or include aspects of, the corresponding element or elements described with reference to FIGS. 1 and 3. Sixth node 555 (N6) may be an example of, or include aspects of, the corresponding element or elements described with reference to FIGS. 1, 3, and 4.

Second capacitor 525 (C2) may be an example of, or include aspects of, the corresponding element or elements described with reference to FIGS. 1, 3, 4, and 18. Third capacitor 530 (C3) may be an example of, or include aspects of, the corresponding element or elements described with reference to FIGS. 1, 3, 4, and 18.

First inductor 535 (L1) may be an example of, or include aspects of, the corresponding element or elements described with reference to FIGS. 1, 3, 4, and 18. Second inductor 540 (L2) may be an example of, or include aspects of, the corresponding element or elements described with reference to FIGS. 1, 3, 4, and 18.

Second switch 545 (Q2) may be an example of, or include aspects of, the corresponding element or elements described with reference to FIGS. 1, 3, and 18. Third switch 560 (Q3) may be an example of, or include aspects of, the corresponding element or elements described with reference to FIGS. 1, 3, and 18.

Figure 6:
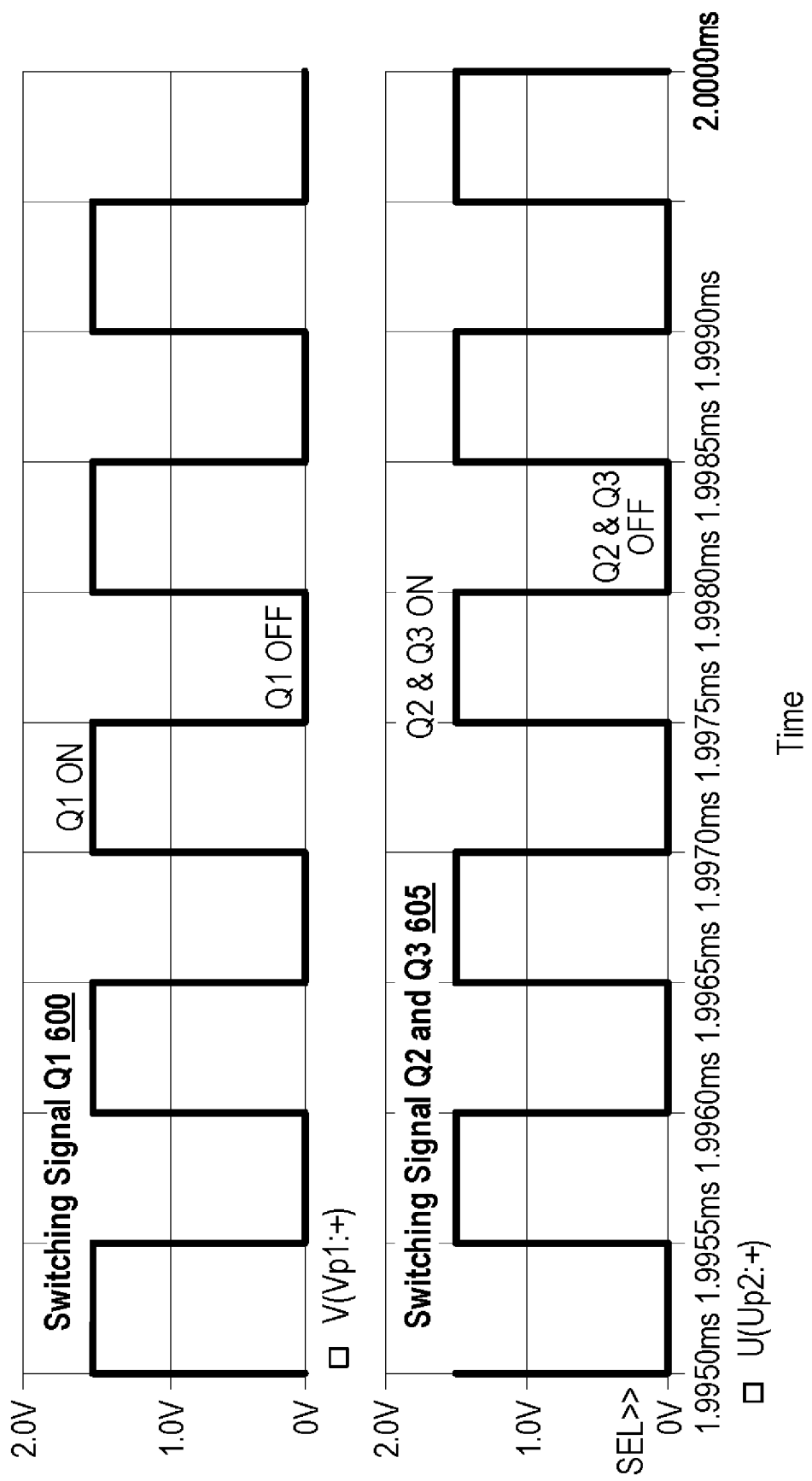
FIG. 6 shows an example of ZVS-HVD switching signal diagram according to aspects of the present disclosure.

FIG. 6 shows an example ZVS-HVD switching signal diagram according to aspects of the present disclosure. The example shown includes switching signal Q1 600 (e.g., a first switching signal that may be applied to a first switch (Q1)) and switching signal Q2 and Q3 605 (e.g., a second switching signal that may be applied to a second switch (Q2) and third switch (Q3)). For instance, switching signal Q1 600 may be applied to a first switch (Q1) as described with reference to FIGS. 1-5. Further, switching signal Q2 and Q3 605 may be applied to a second switch (Q2) and third switch (Q3) as described with reference to FIGS. 1-5.

FIG. 6 may illustrate zero-voltage switching of the ZVS-HVD, where the ZVS-HVD may be switched between the first and second circuit states via the illustrated switching signal Q1 600 and switching signal Q2 and Q3 605. For instance, switching signal Q1 600 and switching signal Q2 and Q3 605 may be alternatively toggled (e.g., with 50% duty cycle) between on and off states (e.g., to toggle or switch the ZVS-HVD between a first circuit state and a second circuit state). As described, the first circuit state may include Q1 being on (e.g., switching signal Q1 600 at 1.5V) and Q2/Q3 being off (e.g., switching signal Q2 and Q3 605 at 0V). The second circuit state may include Q2 being off (e.g., switching signal Q1 600 at 0) and Q2/Q3 being on (e.g., switching signal Q2 and Q3 605 at 1.5V).

Figure 7:
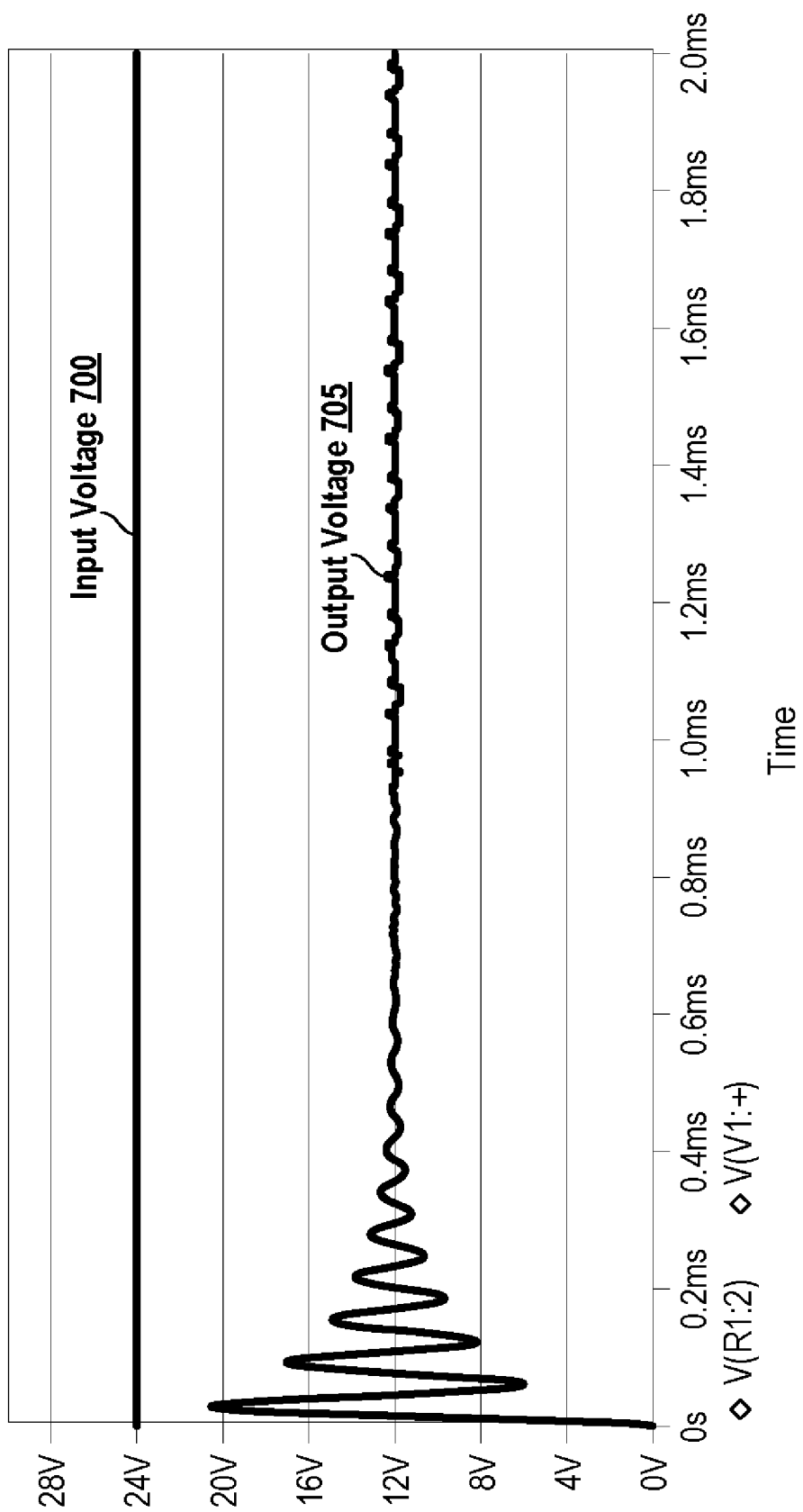
FIGS. 7 through 8 show examples of ZVS-HVD voltage diagram according to aspects of the present disclosure.

FIG. 7 shows an example ZVS-HVD voltage diagram according to aspects of the present disclosure. The example shown includes input voltage 700 (e.g., $V_{in}$ from a power source) and output voltage 705 (e.g., $V_o$ to a load).

FIG. 7 may illustrate input voltage 700 and output voltage 705 associated with zero-voltage switching of the ZVS-HVD, where the ZVS-HVD may be switched between the first and second circuit states as further described with reference to FIG. 6. For instance, FIG. 7 may illustrate how an input voltage 700 of 24V may be efficiently converted to an output voltage 705 of 12V (e.g., via the zero-voltage switching between the first and second circuit states of the ZVS-HVD). As such, USB port voltages may be increased (e.g., from 5V, 9V, 12V, etc. up to 24V and beyond) while maintaining efficient voltage conversion, which may provide for increased charging power (e.g., and thus faster charging of electronic devices).

Figure 8:
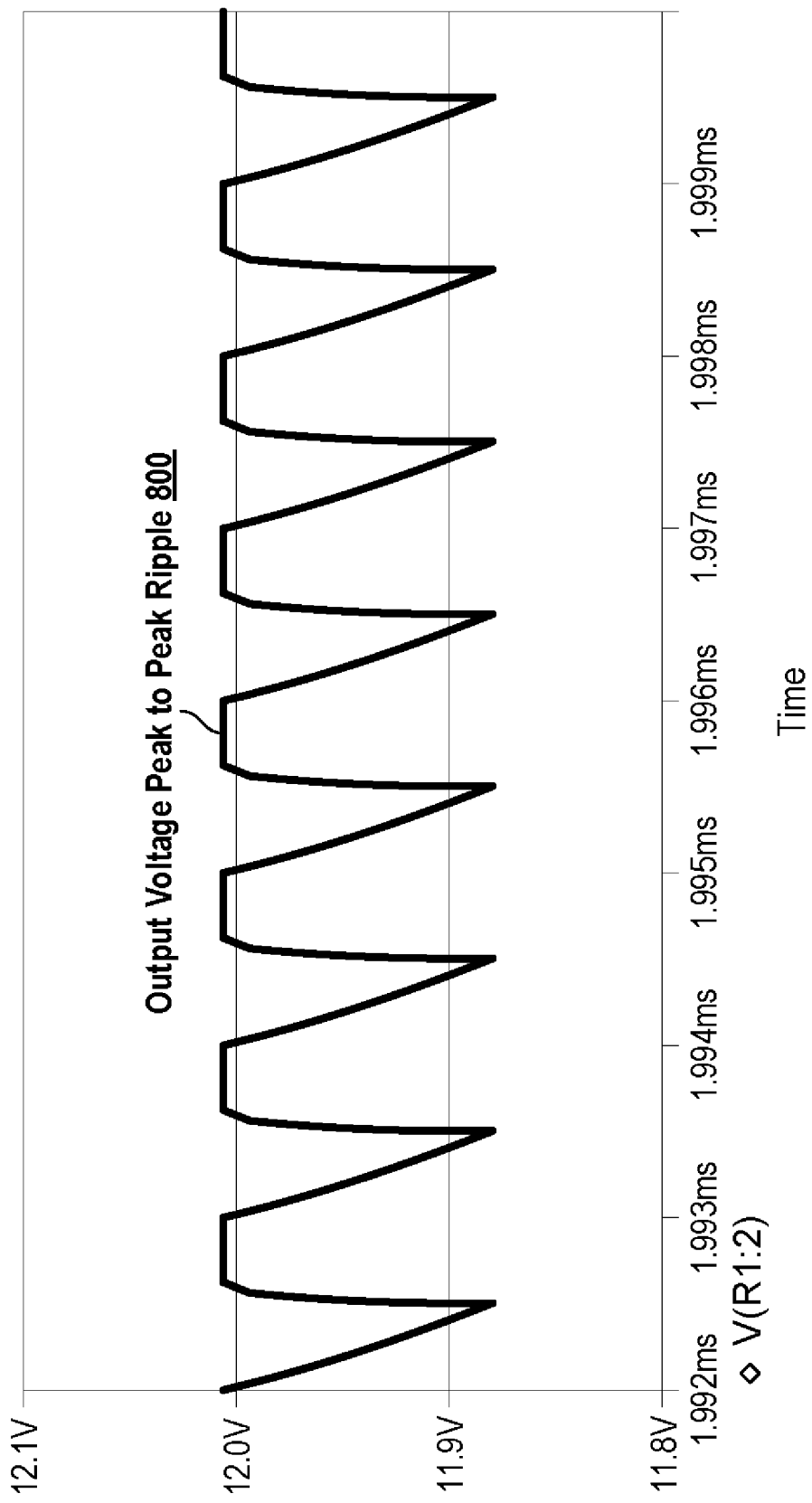

FIG. 8 shows an example ZVS-HVD voltage diagram according to aspects of the present disclosure. The example shown includes output voltage peak to peak ripple 800. As shown, the output voltage peak to peak ripple 800 may be, in the example 2 to 1 ZVS-HVD, between 12.01V and 11.88V. As such, output voltage may be delivered to loads (e.g., such as a battery being charged) with relatively low output voltage peak to peak ripple 800 (e.g., relatively low variance or ripple in output voltage, such as the output 12V).

Figure 9:
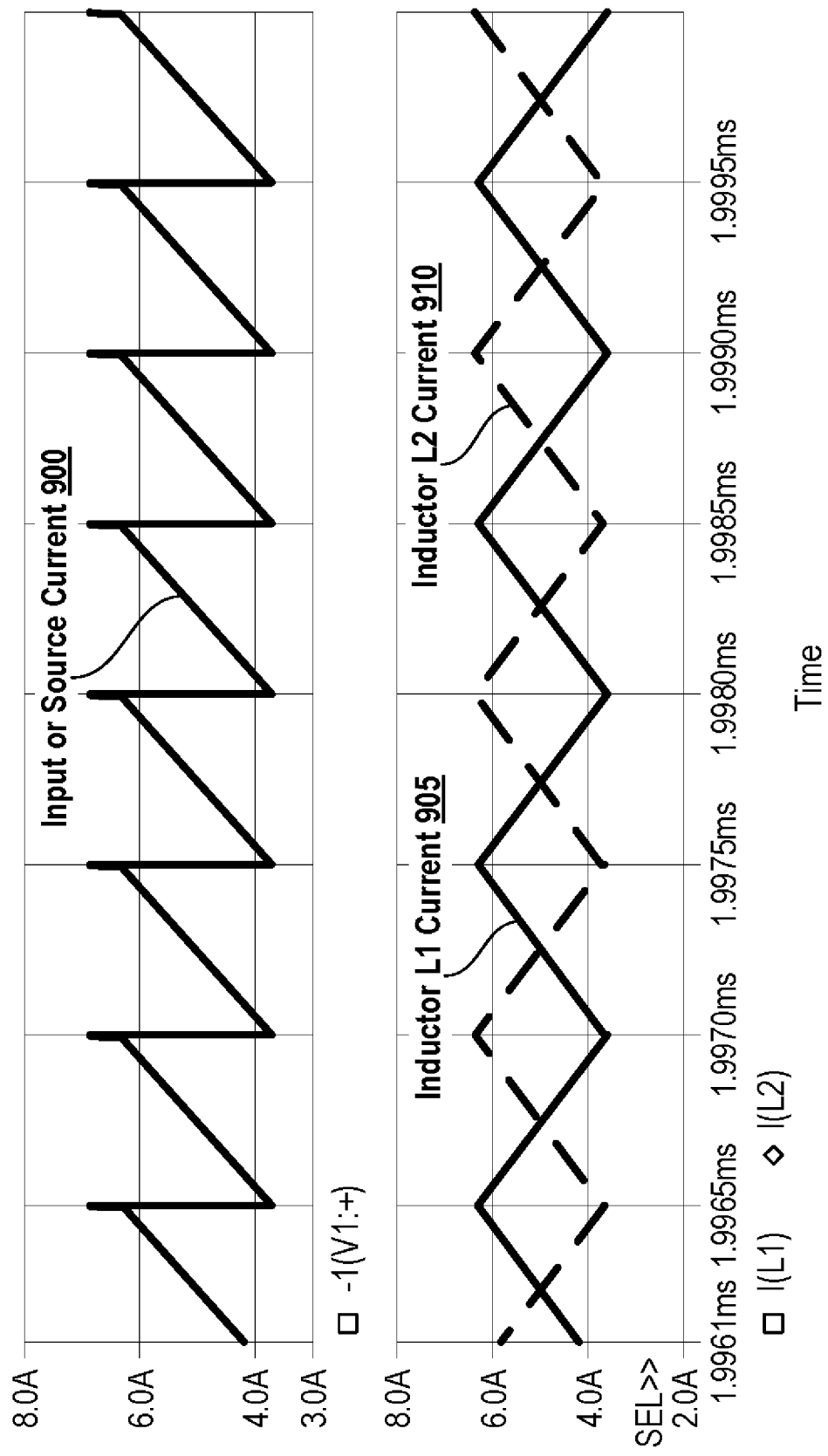
FIGS. 9 through 10 show examples of ZVS-HVD current diagram according to aspects of the present disclosure.

FIG. 9 shows an example ZVS-HVD current diagram according to aspects of the present disclosure. The example shown includes continuous input or source current 900, first inductor current 905, and second inductor current 910. The example shown may illustrate how input or source current may flow through a first inductor (L1) and a second inductor (L2) of an example 2 to 1 ZVS-HVD described herein (e.g., with reference to FIGS. 1 and 3-5).

Figure 10:
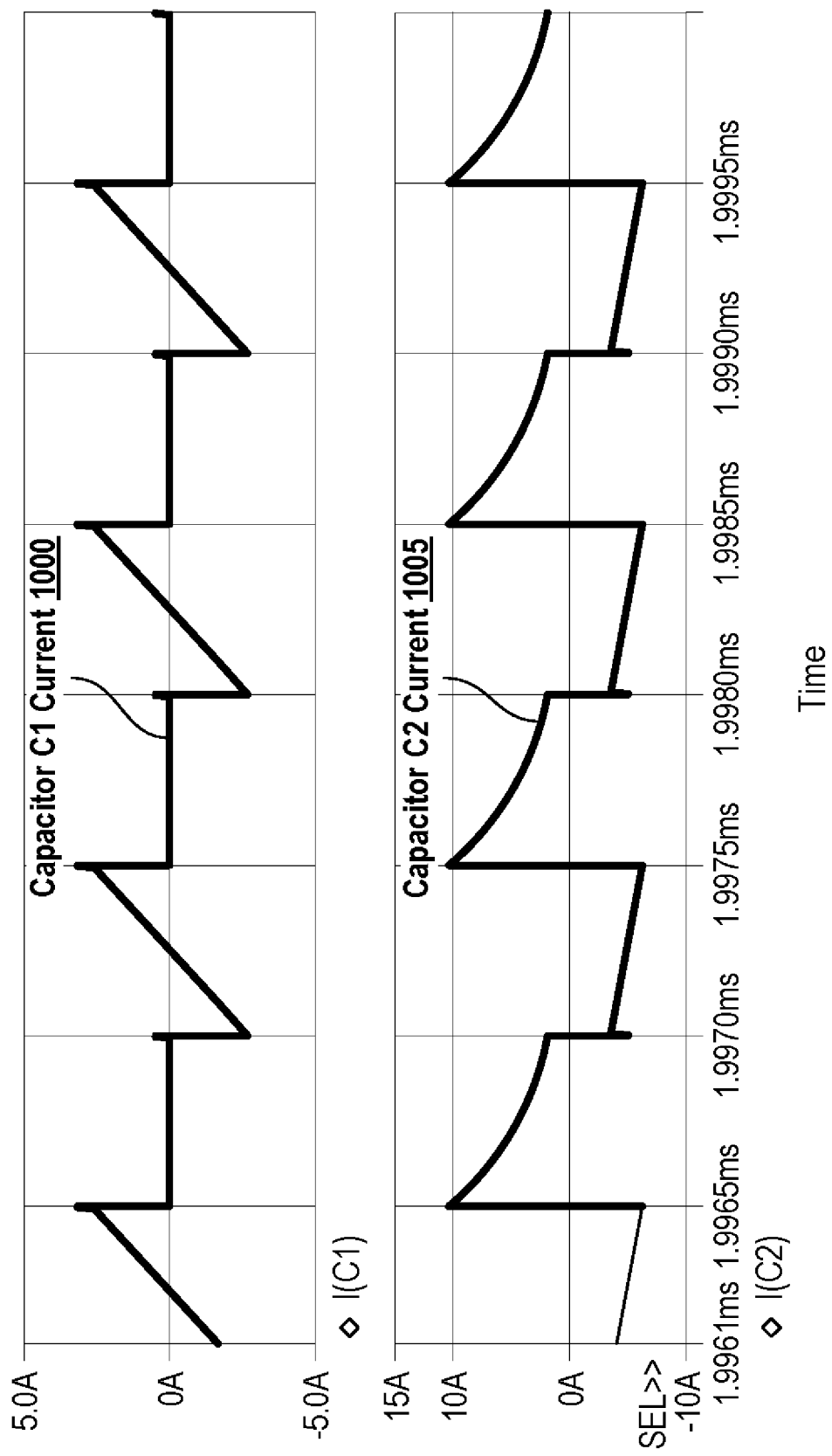

FIG. 10 shows an example ZVS-HVD current diagram according to aspects of the present disclosure. The example shown includes first capacitor current 1000 and second capacitor current 1005. The example shown may illustrate how current may flow through a first capacitor (C1) and a second inductor (C2) of an example 2 to 1 ZVS-HVD described herein (e.g., with reference to FIGS. 1 and 3-5).

Figure 11:
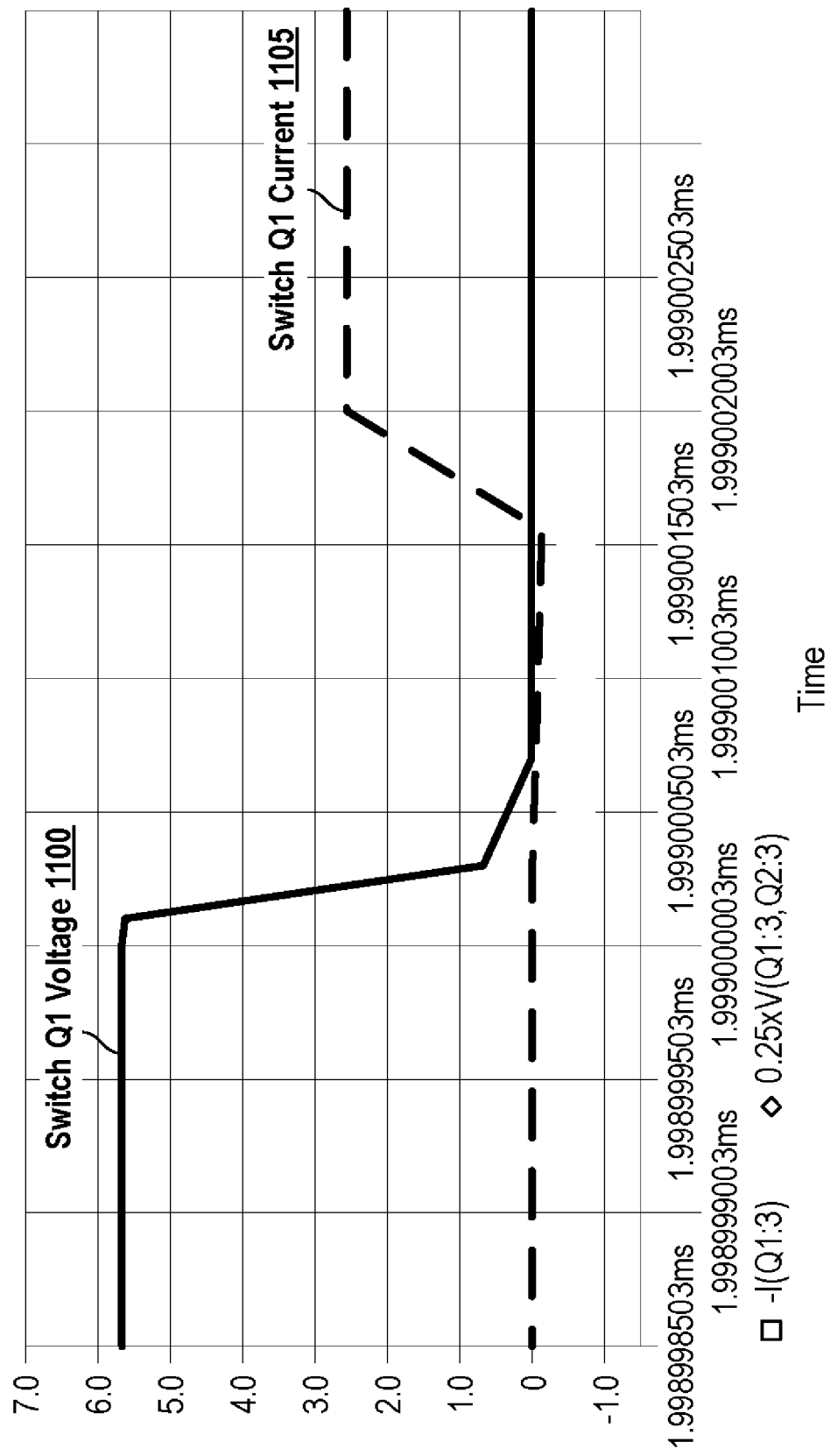
FIGS. 11 through 13 show examples of ZVS-HVD voltage switching diagram according to aspects of the present disclosure.

FIG. 11 shows an example ZVS-HVD voltage switching diagram according to aspects of the present disclosure. The example shown includes first switch voltage 1100 and first switch current 1105. First switch voltage 1100 may illustrate the voltage across a first switch Q1 and first switch current 1105 may illustrate the current flowing through a first switch Q1 (e.g., where Q1 may be a first switch of an example 2 to 1 ZVS-HVD described herein, for example, with reference to FIGS. 1 and 3-5). Specifically, FIG. 11 may illustrate zero-voltage switching when Q1 is turned on (e.g., 0V across Q1 when Q1 is turned on and before the full current flows through Q1).

Figure 12:
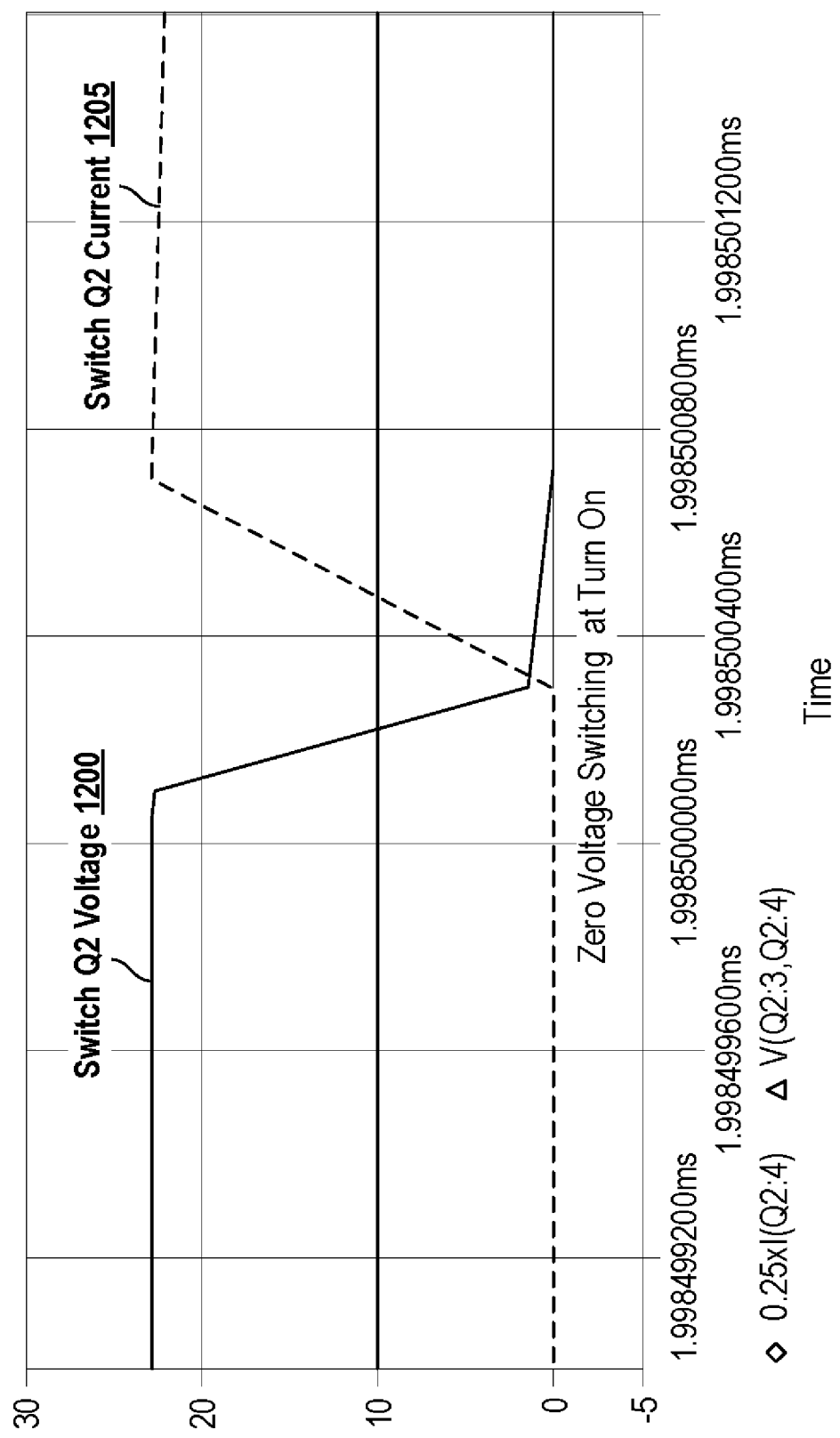

FIG. 12 shows an example ZVS-HVD voltage switching diagram according to aspects of the present disclosure. The example shown includes second switch voltage 1200 and second switch current 1205. Second switch voltage 1200 may illustrate the voltage across a second switch Q2 and second switch current 1205 may illustrate the current flowing through a second switch Q2 (e.g., where Q2 may be a second switch of an example 2 to 1 ZVS-HVD described herein, for example, with reference to FIGS. 1 and 3-5). Specifically, FIG. 12 may illustrate zero-voltage switching when Q2 is turned on (e.g., 0V across Q2 when Q2 is turned on and before the full current flows through Q2).

Figure 13:
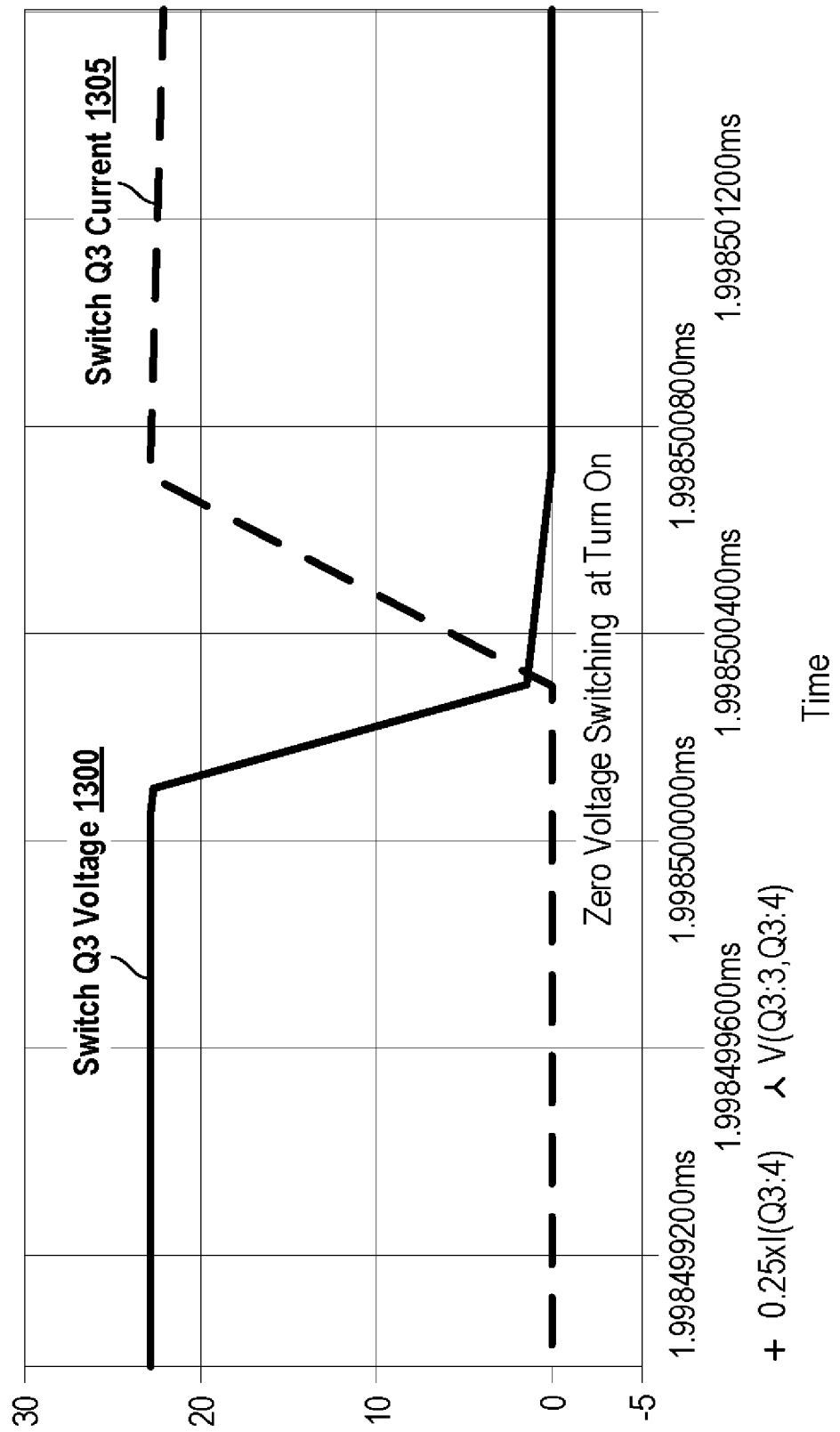

FIG. 13 shows an example ZVS-HVD voltage switching diagram according to aspects of the present disclosure. The example shown includes third switch voltage 1300 and third switch current 1305. Third switch voltage 1300 may illustrate the voltage across a third switch Q3 and third switch current 1305 may illustrate the current flowing through a third switch Q3 (e.g., where Q3 may be a third switch of an example 2 to 1 ZVS-HVD described herein, for example, with reference to FIGS. 1 and 3-5). Specifically, FIG. 13 may illustrate zero-voltage switching when Q3 is turned on (e.g., 0V across Q3 when Q3 is turned on and before the full current flows through Q3).

Figure 14:
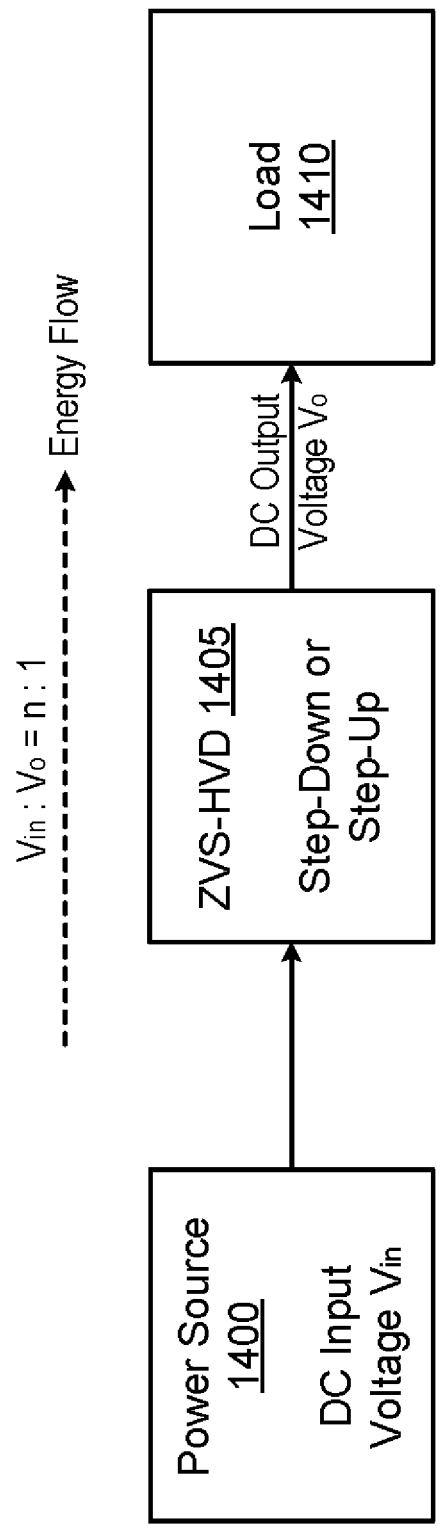
FIGS. 14 through 17 show examples of ZVS-HVD diagram according to aspects of the present disclosure.

FIG. 14 shows an example of a ZVS-HVD 1405 diagram according to aspects of the present disclosure. The example shown includes power source 1400 ($V_{in}$), ZVS-HVD 1405, and load 1410.

In one example, a ZVS-HVD (e.g., ZVS-HVD 1405) may operate as a step down n to 1 converter. For instance, ZVS-HVD 1405 may be implemented such that load or output voltage ($V_o$ to load 1410) is lower than the input voltage (e.g., from power source 1400 ($V_{in}$)). Generally, a step down n to converter may be implemented where n is any integer greater than 1 (e.g., where n=2, 3, 4, . . . ). In such cases, energy flows from the source (e.g., power source 1400) to a load (e.g., load 1410) with lower DC voltage.

In some examples, a ZVS-HVD (e.g., ZVS-HVD 1405) may operate as a step up n to 1 DC-DC converter. In such cases, the load or output voltage ($V_o$ to load 1410) is higher than the input voltage (e.g., from power source 1400 ($V_{in}$)). Generally, a step up n to 1 DC-DC converter may be implemented where n=1/G is any fraction less than 1 (e.g., where G=2, 3, 4, . . . ). In such cases, energy flows from the source (e.g., power source 1400) to a load (e.g., load 1410) with higher DC voltage.

Power source 1400 ($V_{in}$) may be an example of, or include aspects of, the corresponding element or elements described with reference to FIGS. 1, 3-5, 15, 16, and 18. ZVS-HVD 1405 may be an example of, or include aspects of, the corresponding element or elements described with reference to FIGS. 1, 3-5, 15-17. Load 1410 may be an example of, or include aspects of, the corresponding element or elements described with reference to FIGS. 1, 3-5, and 15-18.

Figure 15:
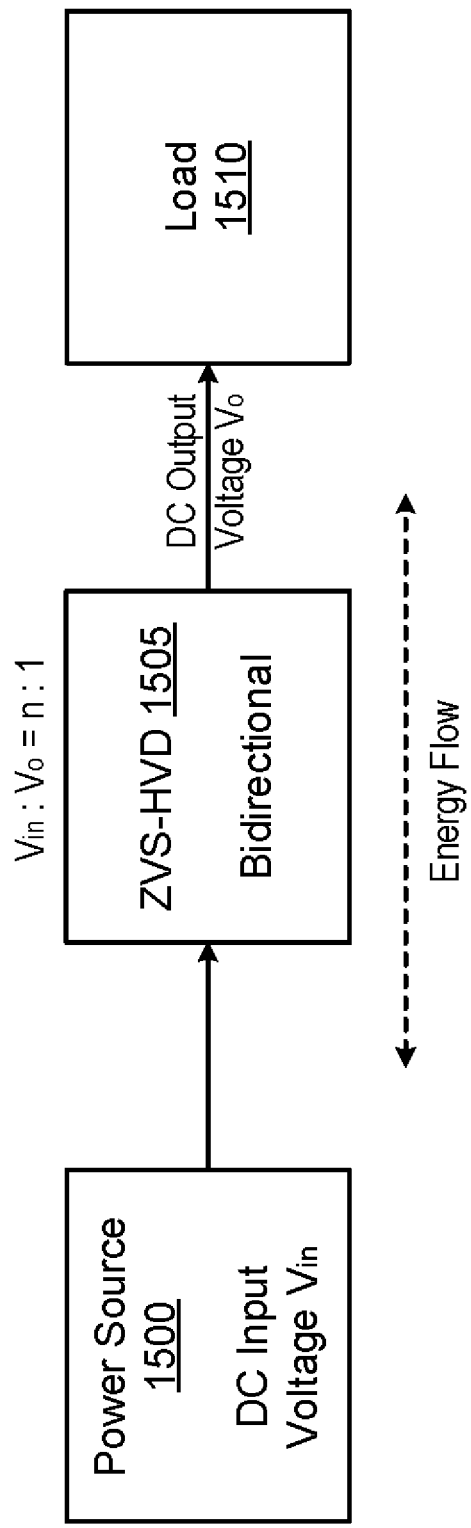

FIG. 15 shows an example of a ZVS-HVD 1505 diagram according to aspects of the present disclosure. The example shown includes power source 1500, ZVS-HVD 1505, and load 1510.

In some examples, a ZVS-HVD (e.g., ZVS-HVD 1505) may operate as a bidirectional DC-DC converter. For instance, ZVS-HVD 1505 may be implemented such that load or output voltage ($V_o$ to load 1510) is either lower or higher than input voltage (e.g., from power source 1500 ($V_{in}$)). For step-down: n may be any integer greater than 1 (e.g., n>1, where n=2, 3, 4, . . . ). For step-up: n=1/G may be any fraction less than 1 (e.g., where G=2, 3, 4, . . . ). As such, energy flow may be from the power source 1500 to the load 1510, or vice versa. ZVS-HVD 1505 may thus be implemented for battery charging circuits, discharging circuits, etc. ZVS-HVD 1505 may be implemented in any load 1510 that has regenerative capability such as regenerative braking, etc.

Power source 1500 may be an example of, or include aspects of, the corresponding element or elements described with reference to FIGS. 1, 3-5, 14, 16, and 18. ZVS-HVD 1505 may be an example of, or include aspects of, the corresponding element or elements described with reference to FIGS. 1, 3-5, 14, 16, and 17. Load 1510 may be an example of, or include aspects of, the corresponding element or elements described with reference to FIGS. 1, 3-5, 14, and 16-18.

Figure 16:
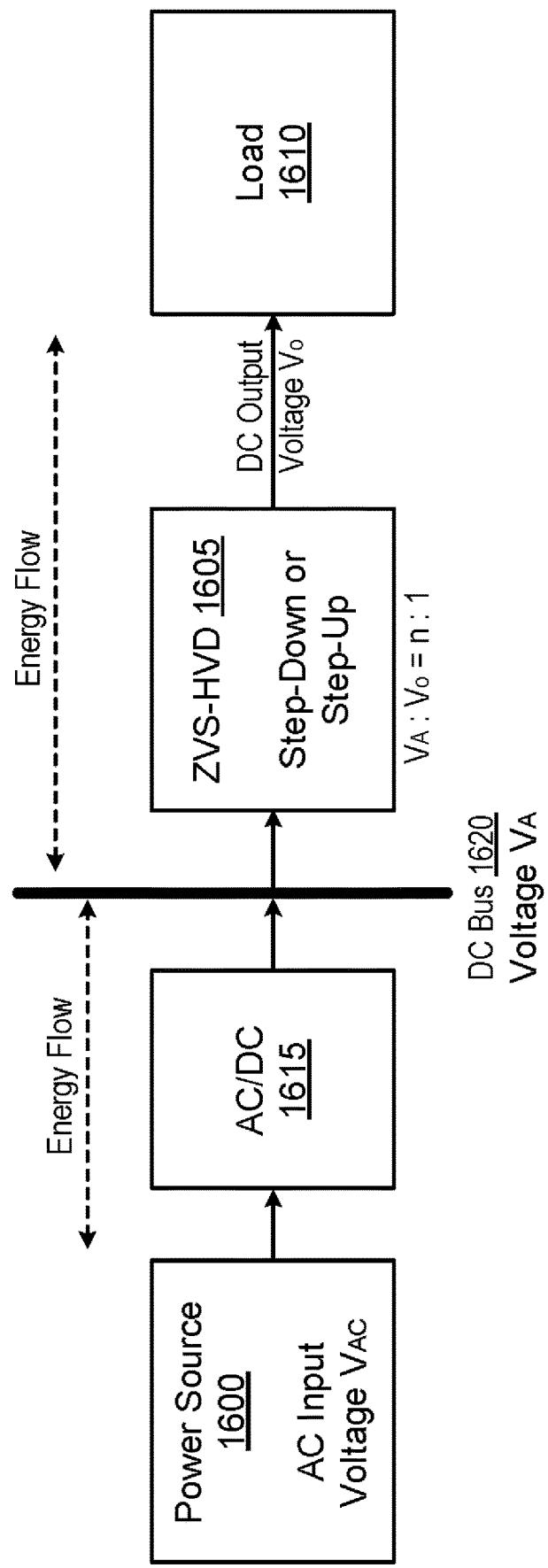

FIG. 16 shows an example of a ZVS-HVD 1605 diagram according to aspects of the present disclosure. The example shown includes power source 1600, ZVS-HVD 1605, load 1610, AC/DC 1615, and DC bus 1620.

In some examples, ZVS-HVD (e.g., ZVS-HVD 1605) may operate as a power supply or power adapter with alternating current (AC) input and DC output. AC input (e.g., AC input voltage $V_{AC}$) may be from a standard AC wall-plug or any other AC power source 1600. From AC to DC bus (e.g., AC/DC 1615) energy flow may be unidirectional or bidirectional. From DC bus (e.g., DC bus 1620) to load (e.g., load 1610) energy flow may also be unidirectional or bidirectional.

From the DC bus 1620 to load 1610, output voltage $V_o$ may be either lower or higher than DC bus 1620 voltage $V_A$. For instance, for step-down: n may be any integer greater than 1 (e.g., n>1, where n=2, 3, 4, . . . ). For step-up: n=1/G may be any fraction less than 1 (e.g., n==1/G<1, where G=2, 3, 4, . . . ). ZVS-HVD 1605 may thus be implemented for use as a wall power adapter for charging portable devices such as mobile phones, tablets, etc. ZVS-HVD 1605 may also be implemented for use as power supply for any AC powered appliances or equipment.

Power source 1600 may be an example of, or include aspects of, the corresponding element or elements described with reference to FIGS. 1, 3-5, 14, 15, and 18. ZVS-HVD 1605 may be an example of, or include aspects of, the corresponding element or elements described with reference to FIGS. 1, 3-5, 14, 15, and 17. Load 1610 may be an example of, or include aspects of, the corresponding element or elements described with reference to FIGS. 1, 3-5, 14, 15, 17, and 18. DC bus 1620 may be an example of, or include aspects of, the corresponding element or elements described with reference to FIG. 17.

Figure 17:
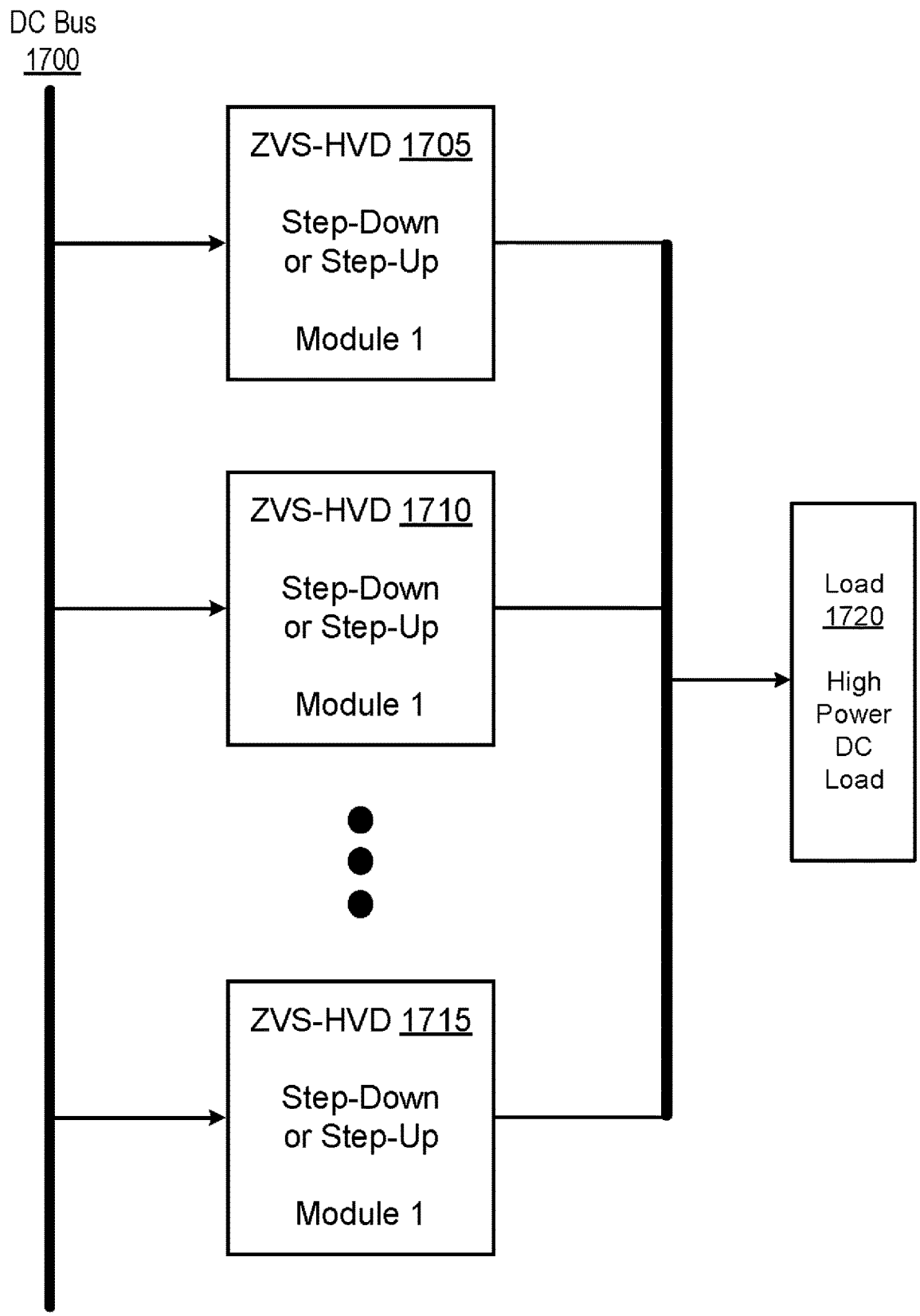

FIG. 17 shows an example diagram of parallel ZVS-HVDs according to aspects of the present disclosure. The example shown includes DC bus 1700, ZVS-HVD 1705, ZVS-HVD 1710, ZVS-HVD 1715, and load 1720.

For example, FIG. 17 may illustrate parallel ZVS-HVDs (e.g., for high power DC loads). DC bus 1700 may be from a DC source (e.g., such as a battery, photovoltaics, etc.) or from rectified standard AC plug or any other sources (e.g., using SC to DC converter). Energy flow may be any of the cases described herein (e.g., with reference to, for example, FIGS. 4, 5, 14-16). For instance, for step-down: n may be any integer greater than 1 (e.g., n>1, where n=2, 3, 4, . . . ). For step-up: n=1/G may be any fraction less than 1 (e.g., n=1/G<1, where G=2, 3, 4, . . . ). In some cases, parallel ZVS-HVDs (e.g., ZVS-HVD 1705, ZVS-HVD 1710, ZVS-HVD 1715) may be implemented for use for high-power power supply for any AC-powered or DC-powered equipment.

DC bus 1700 may be an example of, or include aspects of, the corresponding element or elements described with reference to FIG. 16. ZVS-HVDs 1705-1715 may be examples of, or include aspects of, the corresponding element or elements described with reference to FIGS. 1, 3-5, 14-16, and 18. Load 1710 may be an example of, or include aspects of, the corresponding element or elements described with reference to FIGS. 1, 3-5, 14-16, and 18.

Figure 18:
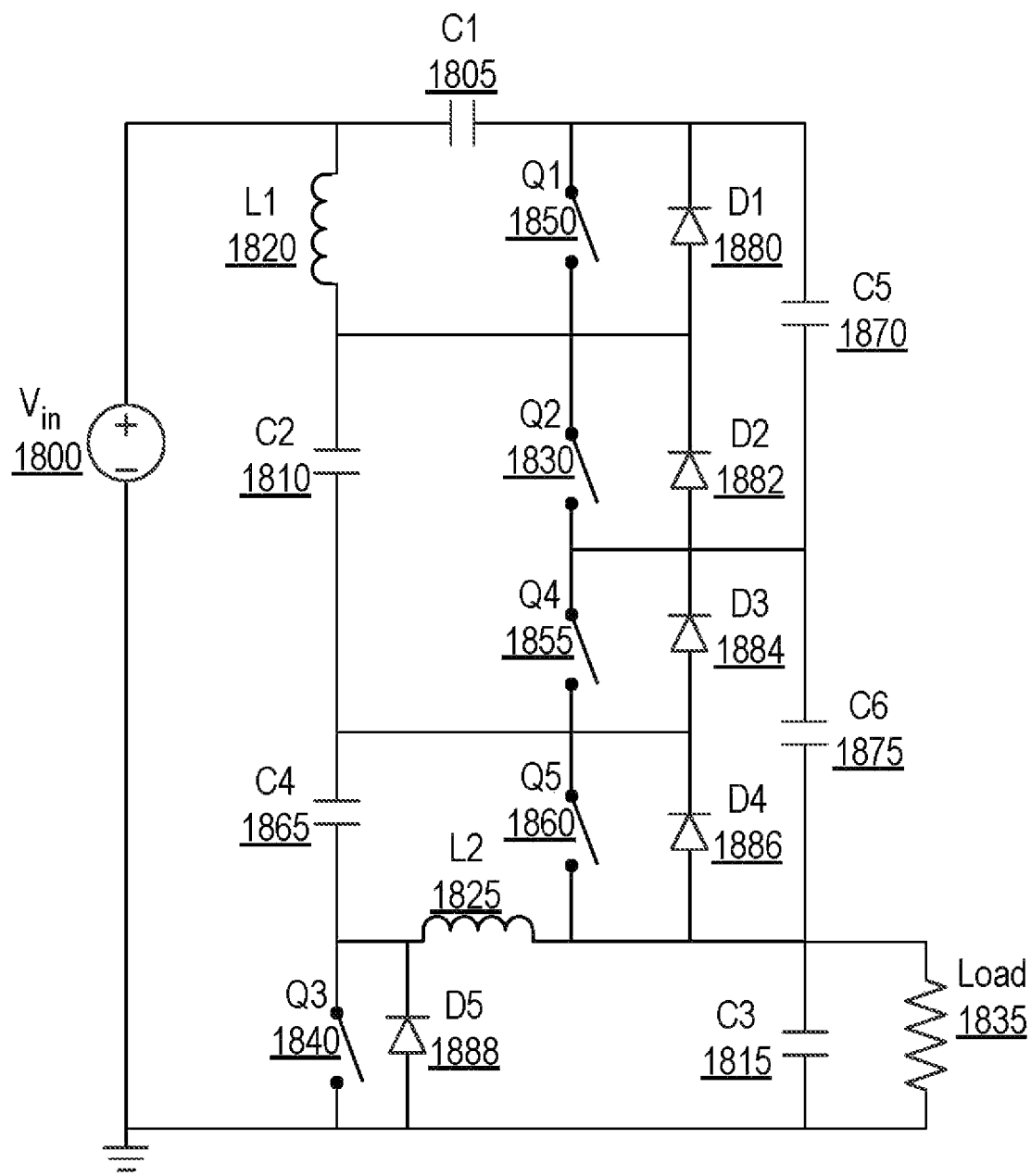
FIG. 18 shows an example of ZVS-HVD according to aspects of the present disclosure.

FIG. 18 shows an example of a ZVS-HVD according to aspects of the present disclosure. The example shown includes power source 1800 ($V_{in}$), first capacitor 1805 (C1), second capacitor 1810 (C2), third capacitor 1815 (C3), first inductor 1850 (L1), second inductor 1855 (L2), second switch 1830 (Q2), load 1835, third switch 1900 (Q3), first switch 1850 (Q1), fourth switch 1855 (Q4), fifth switch 1860 (Q5), fourth capacitor 1865 (C4), fifth capacitor 1870 (C5), sixth capacitor 1875 (C6), first diode 1880 (D1), second diode 1882 (D2), third diode 1884 (D3), fourth diode 1886 (D4), and fifth diode 1888 (D5).

FIG. 18 may illustrate an example of extending a 2 to 1 ZVS-HVD to implement a 4 to 1 ratio. As shown, increasing the ratio may be implemented by adding more switches (e.g., fourth switch 1855 (Q4) and fifth switch 1860 (Q5)), capacitors (e.g., fourth capacitor 1865 (C4), fifth capacitor 1870 (C5), and sixth capacitor 1875 (C6)), and diodes (e.g., first diode 1880 (D1), second diode 1882 (D2), third diode 1884 (D3), fourth diode 1886 (D4), and fifth diode 1888 (D5)) accordingly. As such, various ZVS-HVDs and ZVS-HVD configurations (e.g., parallel ZVS-HVD configurations, ZVS-HVDs with various ratios, etc.) may be designed and implemented by analogy, without departing from the scope of the present disclosure.

Power source 1800 may be an example of, or include aspects of, the corresponding element or elements described with reference to FIGS. 1, 3-5, and 14-16. First capacitor 1805 may be an example of, or include aspects of, the corresponding element or elements described with reference to FIGS. 1, and 3-5. Second capacitor 1810 may be an example of, or include aspects of, the corresponding element or elements described with reference to FIGS. 1, and 3-5. Third capacitor 1815 may be an example of, or include aspects of, the corresponding element or elements described with reference to FIGS. 1, and 3-5. First inductor 1850 may be an example of, or include aspects of, the corresponding element or elements described with reference to FIGS. 1, and 3-5. Second inductor 1855 may be an example of, or include aspects of, the corresponding element or elements described with reference to FIGS. 1, and 3-5. First switch 1850 may be an example of, or include aspects of, the corresponding element or elements described with reference to FIGS. 1, 3, and 4. Second switch 1830 may be an example of, or include aspects of, the corresponding element or elements described with reference to FIGS. 1, 3, and 5. Load 1835 may be an example of, or include aspects of, the corresponding element or elements described with reference to FIGS. 3-5, and 14-17. Third switch 1900 may be an example of, or include aspects of, the corresponding element or elements described with reference to FIGS. 1, 3, and 5.

Accordingly, the present disclosure includes the following embodiments.

An apparatus for a ZVS-HVD is described. Embodiments of the apparatus may include a first node and a second node configured to receive a direct current supply voltage, a first inductor coupled between the first node, and a third node, a first capacitor coupled between the first node, and a fourth node, a first switch coupled between the fourth node, and the third node, a second capacitor coupled between the third node, and a fifth node, a second inductor coupled between the fifth node, and a sixth node, a second switch coupled between the third node, and the sixth node, and a third capacitor coupled between a second node, and the sixth node, wherein the second node, and the sixth node are configured to supply a load.

A method of manufacturing an apparatus for a ZVS-HVD is described. The method may include providing a first node and a second node configured to receive a direct current supply voltage, providing a first inductor coupled between the first node, and a third node, providing a first capacitor coupled between the first node, and a fourth node, providing a first switch coupled between the fourth node, and the third node, providing a second capacitor coupled between the third node, and a fifth node, providing a second inductor coupled between the fifth node, and a sixth node, providing a second switch coupled between the third node, and the sixth node, and providing a third capacitor coupled between a second node, and the sixth node, wherein the second node, and the sixth node are configured to supply a load.

A method of using an apparatus for a ZVS-HVD is described. The method may include using a first node and a second node configured to receive a direct current supply voltage, using a first inductor coupled between the first node, and a third node, using a first capacitor coupled between the first node, and a fourth node, using a first switch coupled between the fourth node, and the third node, using a second capacitor coupled between the third node, and a fifth node, using a second inductor coupled between the fifth node, and a sixth node, using a second switch coupled between the third node, and the sixth node, and using a third capacitor coupled between a second node, and the sixth node, wherein the second node, and the sixth node are configured to supply a load.

In some examples, a first switching signal is coupled to the first switch. In some examples, a second switching signal is coupled to the second switch and a third switch. In some examples, the first switching signal and the second switching signal are configured to close the first switch and open the second switch and the third switch in a first circuit state, and are configured to open the first switch and close the second switch and the third switch in a second circuit state.

In some examples, the first switching signal has a duty cycle of 50%. In some examples, the second switching signal has a duty cycle of 50%.

Some examples of the apparatus, system, and method described above may further include a second direct current supply current coupled between the second node and the sixth node. Some examples may further include a second load coupled between the first node and the second node, whereby the ZVS-HVD is configured as a zero-voltage switching bidirectional voltage divider.

Some examples of the apparatus, system, and method described above may further include a second ZVS-HVD coupled to the load in parallel with the ZVS-HVD.

In some examples, the first inductor and the second inductor are coupled inductors.

A method for a ZVS-HVD is described. Embodiments of the method may include providing a first node and a second node configured to receive a direct current supply voltage, providing a first inductor coupled between the first node, and a third node, providing a first capacitor coupled between the first node, and a fourth node, providing a first switch coupled between the fourth node, and the third node, providing a second capacitor coupled between the third node, and a fifth node, providing a second inductor coupled between the fifth node, and a sixth node, providing a second switch coupled between the third node, and the sixth node, providing a third capacitor coupled between a second node, and the sixth node, wherein the second node, and the sixth node are configured to supply a load, applying a first switching signal to the first switch, applying a second switching signal simultaneously to the second switch and the third switch, first signaling with the first switching signal and the second switching signal to close the first switch and open the second switch and the third switch, second signaling with the first switching signal and the second switching signal to open the first switch and close the second switch and the third switch, and repeating the first switching and the second switching sequentially.

In some examples, the first switching signal has a duty cycle of 50%. In some examples, the second switching signal has a duty cycle of 50%.

Some examples of the method, apparatus, non-transitory computer readable medium, and system described above may further include providing a second direct current supply current coupled between the second node and the sixth node. Some examples may further include providing a second load coupled between the first node and the second node, whereby the hybrid voltage divider is configured as a zero-voltage switching bidirectional voltage divider.

Some examples of the method, apparatus, non-transitory computer readable medium, and system described above may further include providing a second ZVS-HVD coupled to the load in parallel with the ZVS-HVD.

In some examples, the first inductor and the second inductor are coupled inductors.

While the invention herein disclosed has been described by means of specific embodiments, examples and applications thereof, numerous modifications and variations could be made thereto by those skilled in the art without departing from the scope of the invention set forth in the claims.

What is claimed is:

1. A zero-voltage switching hybrid voltage divider, comprising:
 a first node and a second node configured to receive a direct current supply voltage;
 a first inductor coupled between the first node, and a third node;
 a first capacitor coupled between the first node, and a fourth node;
 a first switch coupled between the fourth node, and the third node;
 a first switching signal coupled to the first switch;
 a second capacitor coupled between the third node, and a fifth node;

a second inductor coupled between the fifth node, and a sixth node;

a second switch coupled between the third node, and the sixth node; and a third capacitor coupled between the second node, and the sixth node, wherein the second node, and the sixth node are configured to supply a load;

a third switch coupled between the second node, and the fifth node; and a second switching signal coupled to the second switch and the third switch, wherein the first switching signal and the second switching signal are configured to close the first switch and open the second switch and the third switch in a first circuit state, and are configured to open the first switch and close the second switch and the third switch in a second circuit state.

2. The zero-voltage switching hybrid voltage divider of claim 1, further comprising:

said first switching signal, wherein said first switching signal has a duty cycle of 50%; and said second switching signal, wherein said second switching signal has a duty cycle of 50%.

3. The zero-voltage switching hybrid voltage divider of claim 1, further comprising:

a second direct current supply current coupled between the second node and the sixth node; and a second load coupled between the first node and the second node;

whereby the zero-voltage switching hybrid voltage divider is configured as a zero-voltage switching bidirectional voltage divider.

4. The zero-voltage switching hybrid voltage divider of claim 1, further comprising:

a second zero-voltage switching hybrid voltage divider coupled to the load in parallel with the zero-voltage switching hybrid voltage divider of claim 1.

5. The zero-voltage switching hybrid voltage divider of claim 1, further comprising:

said first inductor and said second inductor, wherein said first inductor and said second inductor are coupled inductors.

6. A method of zero-voltage switching in a hybrid voltage divider comprising:

providing a first node and a second node configured to receive a direct current supply voltage;

providing a first inductor coupled between the first node, and a third node;

providing a first capacitor coupled between the first node, and a fourth node;

providing a first switch coupled between the fourth node, and the third node;

providing a second capacitor coupled between the third node, and a fifth node;

providing a second inductor coupled between the fifth node, and a sixth node;

providing a second switch coupled between the third node, and the sixth node;

providing a third capacitor coupled between the second node, and the sixth node, wherein the second node, and the sixth node are configured to supply a load;

providing a third switch coupled between the second node, and the fifth node;

applying a first switching signal to the first switch;

applying a second switching signal simultaneously to the second switch and the third switch;

first signaling with the first switching signal and the second switching signal to close the first switch and open the second switch and the third switch;

second signaling with the first switching signal and the second switching signal to open the first switch and close the second switch and the third switch; and repeating the first switching and the second switching sequentially.

7. The method of zero-voltage switching in the hybrid voltage divider of claim 6, further comprising:

said first signaling with the first switching signal, where said first switching signal has a duty cycle of 50%; and said second signaling with the second switching signal, wherein said second switching signal has a duty cycle of 50%.

8. The method of zero-voltage switching in the hybrid voltage divider of claim 6, further comprising:

providing a second direct current supply current coupled between the second node and the sixth node; and providing a second load coupled between the first node and the second node;

whereby the hybrid voltage divider is configured as a zero-voltage switching bidirectional voltage divider.

9. The method of zero-voltage switching in the hybrid voltage divider of claim 6, further comprising:

providing a second zero-voltage switching hybrid voltage divider coupled to the load in parallel with the zero-voltage switching hybrid voltage divider.

10. The method of zero-voltage switching in the hybrid voltage divider of claim 6, wherein:

said providing said first inductor and said providing said second inductor, wherein said first inductor and said second inductor are coupled inductors.

11. A method of manufacturing an apparatus for zero-voltage switching hybrid voltage division, the method comprising:

providing a first node and a second node configured to receive a direct current supply voltage;

providing a first inductor coupled between the first node, and a third node;

providing a first capacitor coupled between the first node, and a fourth node;

providing a first switch coupled between the fourth node, and the third node;

providing a first switching signal coupled to the first switch;

providing a second capacitor coupled between the third node, and a fifth node;

providing a second inductor coupled between the fifth node, and a sixth node;

providing a second switch coupled between the third node, and the sixth node; and providing a third capacitor coupled between the second node, and the sixth node, wherein the second node, and the sixth node are configured to supply a load;

providing a third switch coupled between the second node and the fifth node;

providing a second switching signal coupled to the second switch and the third switch; and the first switching signal and the second switching signal are configured to close the first switch and open the second switch and the third switch in a first circuit state, and are configured to open the first switch and close the second switch and the third switch in a second circuit state.

12. The method of claim 11, wherein:
the first switching signal has a duty cycle of 50%; and
the second switching signal has a duty cycle of 50%.

13. The method of claim 11, further comprising:
providing a second direct current supply current coupled between the second node and the sixth node; and
providing a second load coupled between the first node and the second node, whereby the zero-voltage switching hybrid voltage divider is configured as a zero-voltage switching bidirectional voltage divider.

14. The method of claim 11, further comprising:
providing a second zero-voltage switching hybrid voltage divider coupled to the load in parallel with the zero-voltage switching hybrid voltage divider.

15. The method of claim 11, wherein:
the first inductor and the second inductor are coupled inductors.

* * * * *